United States Patent [19]

Nagashima et al.

[11] Patent Number: 4,988,853
[45] Date of Patent: Jan. 29, 1991

[54] TICKET CHECKING/ISSUING APPARATUS IN WHICH FRICTION HOLDS A TICKET WHILE RECORDING/REPRODUCING DATA

[75] Inventors: Masayoshi Nagashima, Chigasaki; Shinichi Kawahara, Sagamihara, both of Japan

[73] Assignee: Kabushiki Kaisha Toshiba, Kawasaki, Japan

[21] Appl. No.: 263,171

[22] Filed: Oct. 27, 1988

[30] Foreign Application Priority Data

Nov. 13, 1987 [JP] Japan .................... 62-288137

[51] Int. Cl.$^5$ .................... G06K 7/08; G06K 7/15
[52] U.S. Cl. .................... 235/475; 235/449; 235/486; 360/2
[58] Field of Search .................... 360/2; 235/449, 479, 235/486, 483, 485, 475

[56] References Cited

U.S. PATENT DOCUMENTS

| | | | |
|---|---|---|---|
| 3,560,715 | 2/1971 | Akamatsu et al. | 235/479 |
| 4,081,131 | 3/1978 | Sand et al. | 235/449 |
| 4,592,042 | 5/1986 | Lemelson et al. | 235/486 |
| 4,900,909 | 2/1990 | Nagashima | 235/432 |

*Primary Examiner*—Stuart S. Levy
*Assistant Examiner*—Robert Weinhardt
*Attorney, Agent, or Firm*—Cushman, Darby & Cushman

[57] ABSTRACT

A ticket checking/issuing apparatus for checking and issuing a ticket on which data is recorded, includes a ticket holding unit for holding the ticket, and a head unit which is moved along the holding unit. The head unit has a magnetic head which is brought into sliding contact with the ticket held by the holding unit so as to record and/or reproduce data on and/or from the ticket. A friction member is arranged on a surface of the holding unit opposing the head unit. The friction member has a friction coefficient between itself and the ticket larger than that between the magnetic head of the head unit and the ticket. The friction member is brought into sliding contact with the magnetic head when the head unit is moved while the holding unit does not hold a ticket, and is brought into contact with the ticket held by the holding unit when the holding unit holds the ticket. An apparatus for recording magnetic information to a recording area of a medium, which includes a magnetic head, moved along the recording area of the medium, for recording the magnetic information to the recording area of the medium, and a unit for holding the medium. The unit for holding the medium has a friction coefficient between itself and the medium larger than that between the magnetic head and the medium.

8 Claims, 23 Drawing Sheets

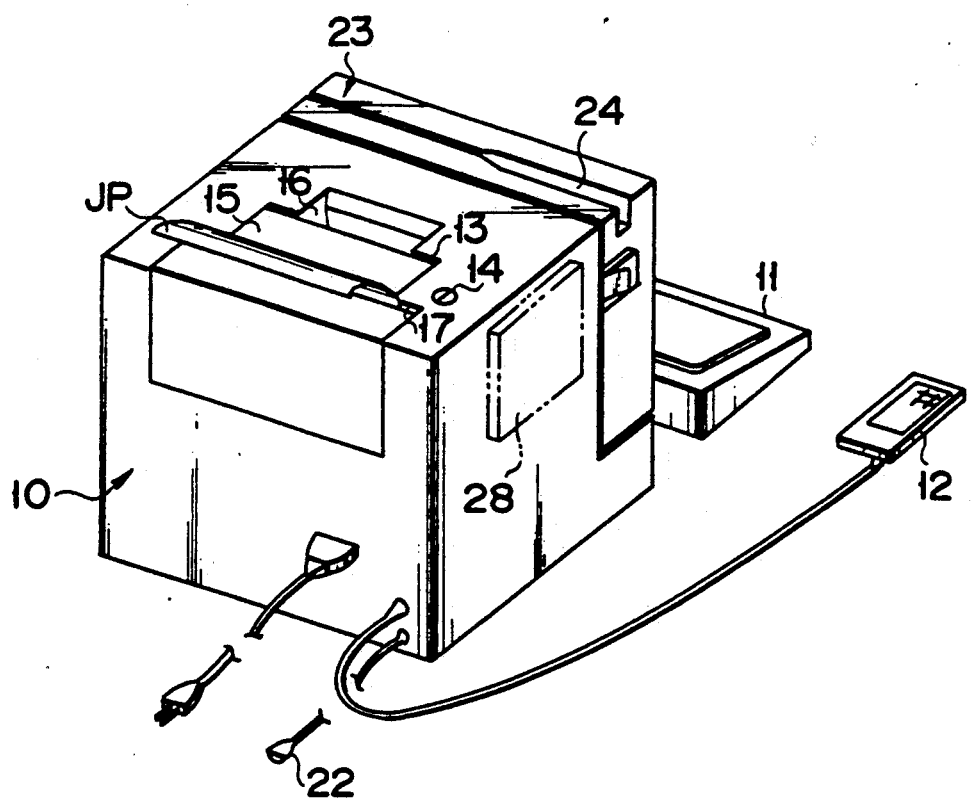
F I G. 3
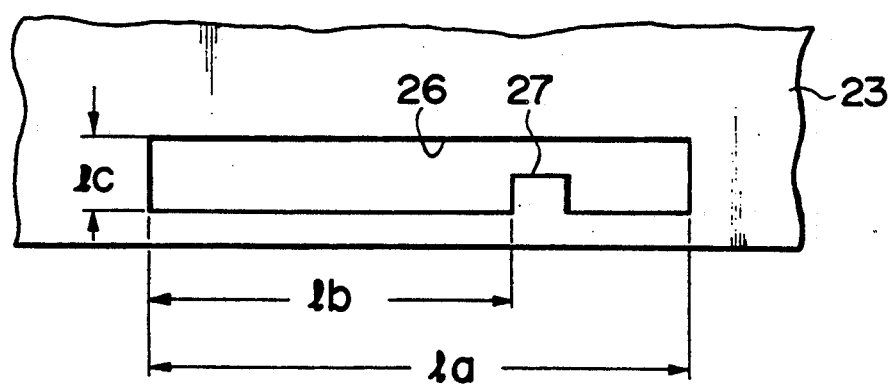
F I G. 4

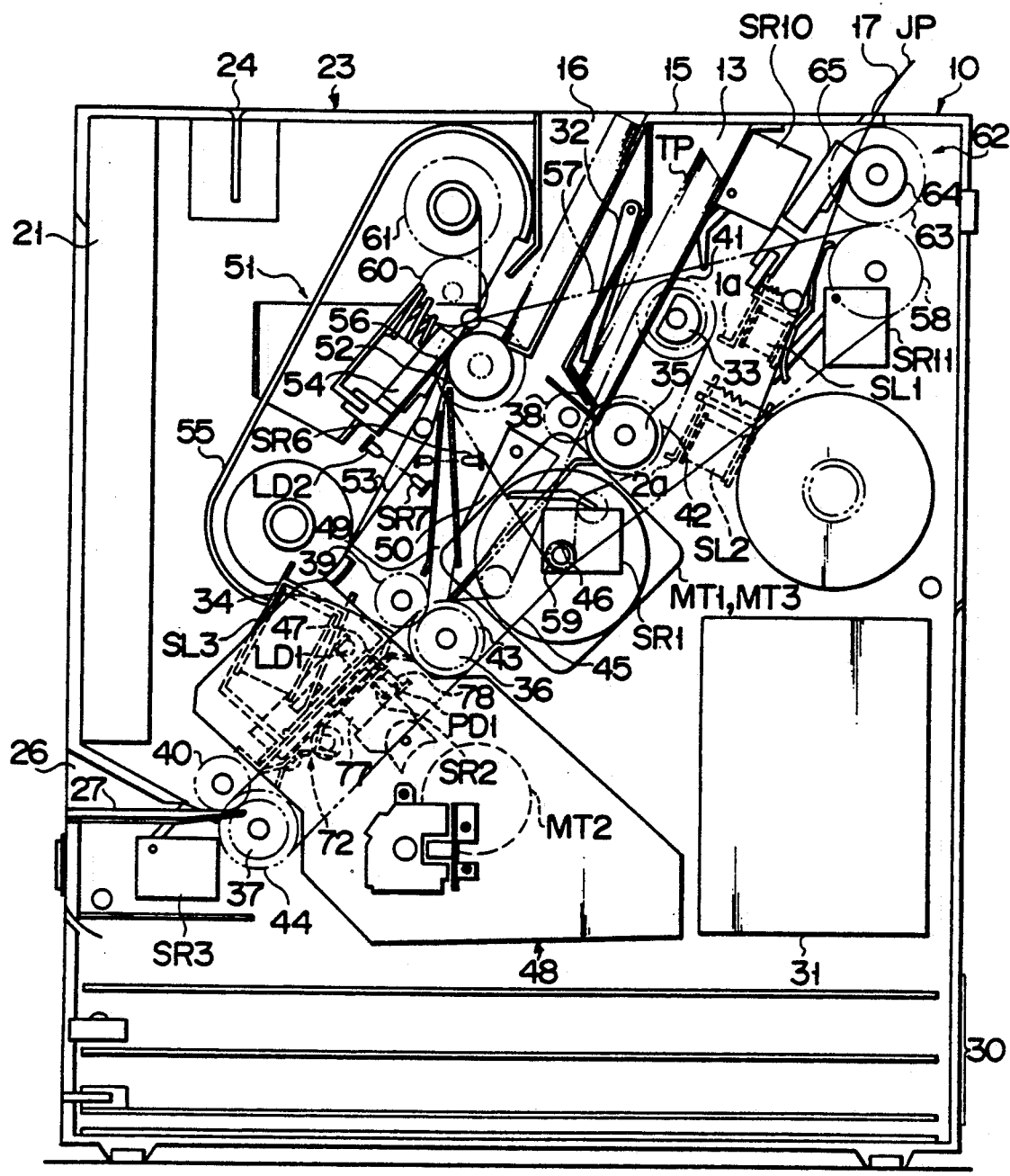
F I G. 5

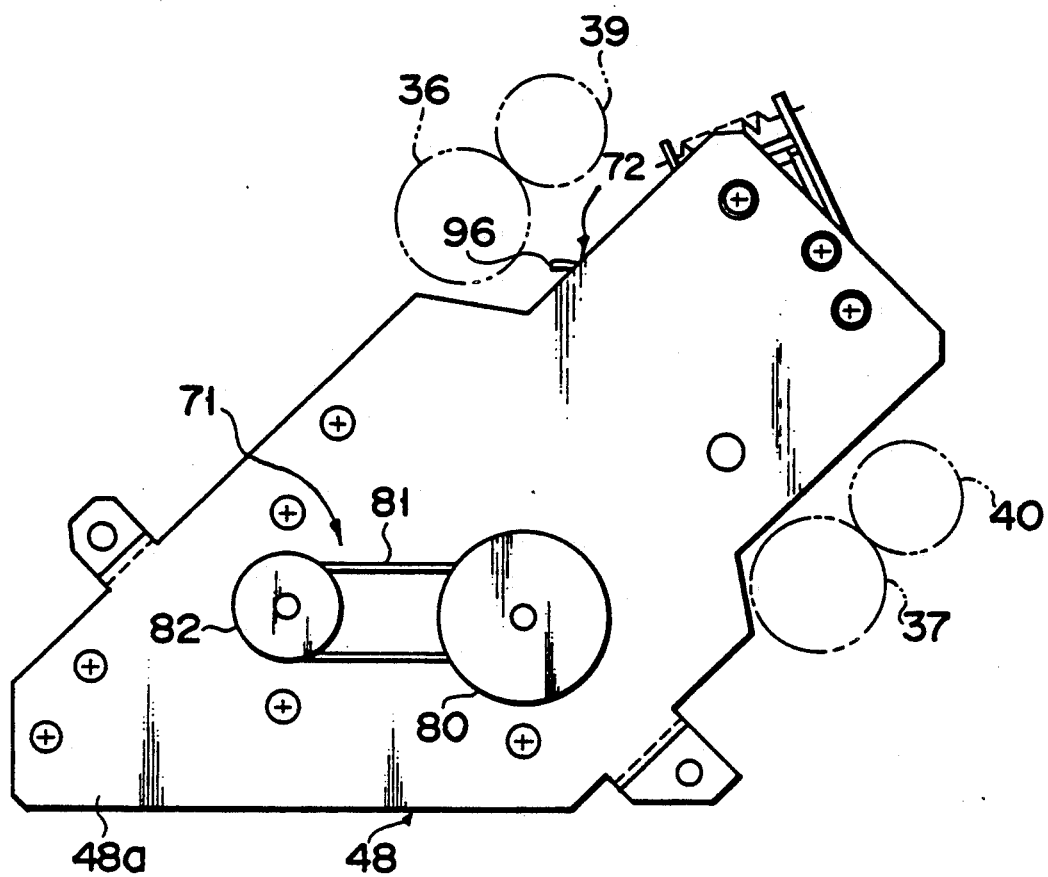
F I G. 13

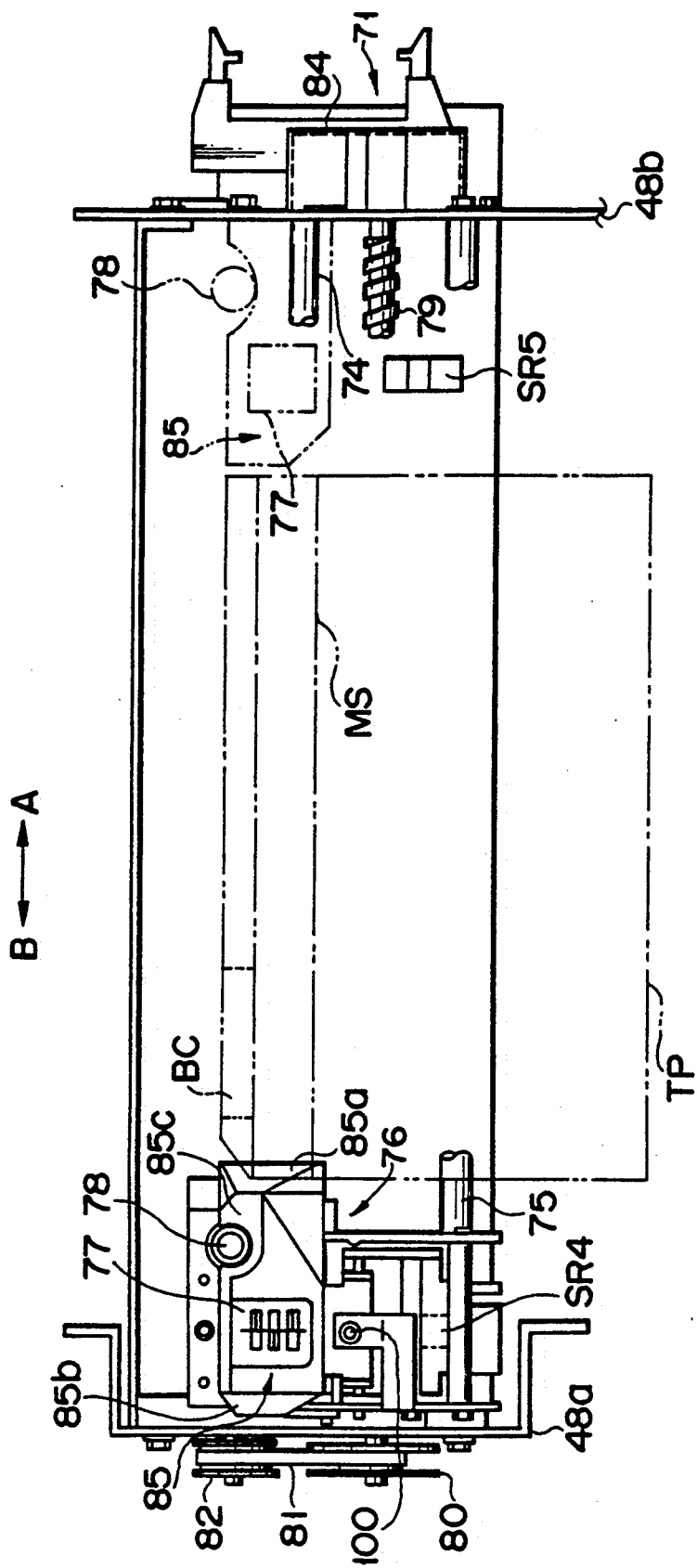
F I G. 16

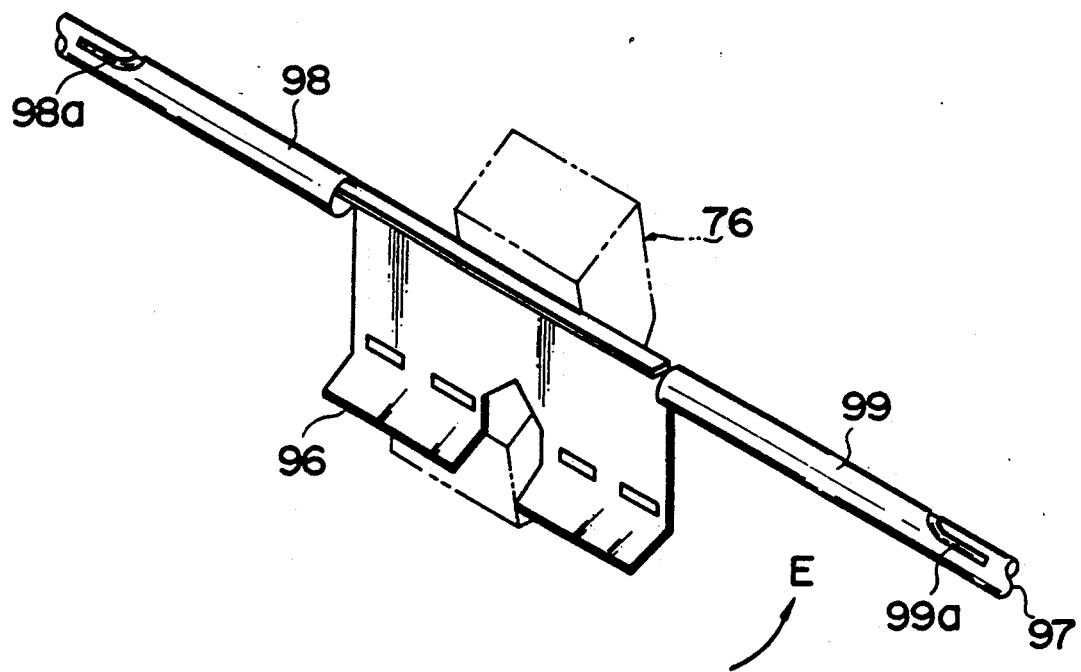
F I G. 20
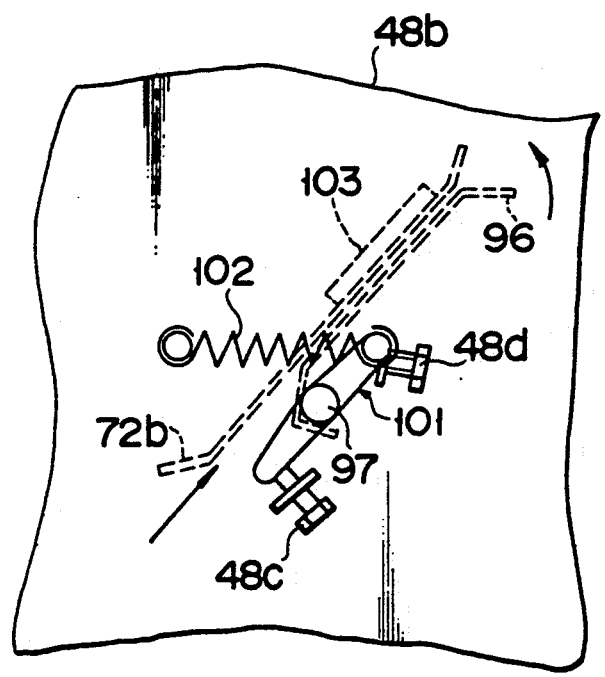
F I G. 21

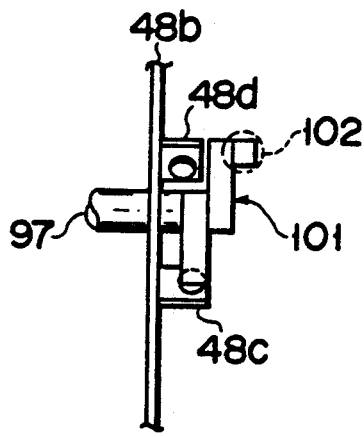
F I G. 22
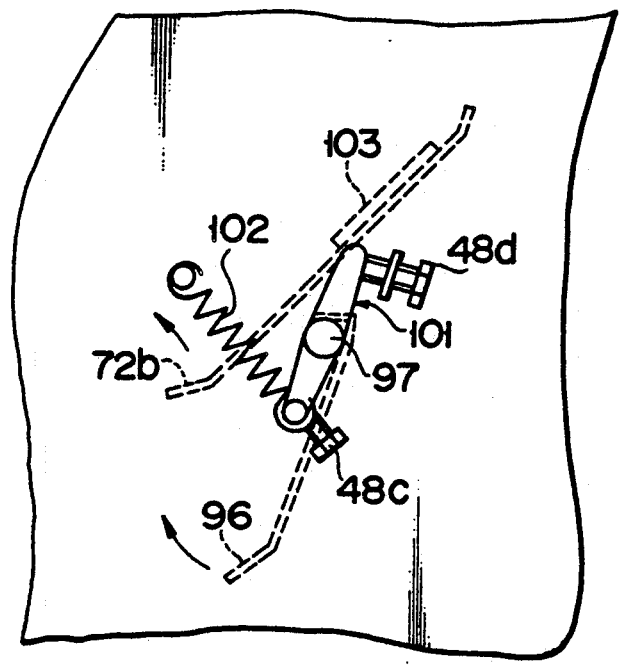
F I G. 23
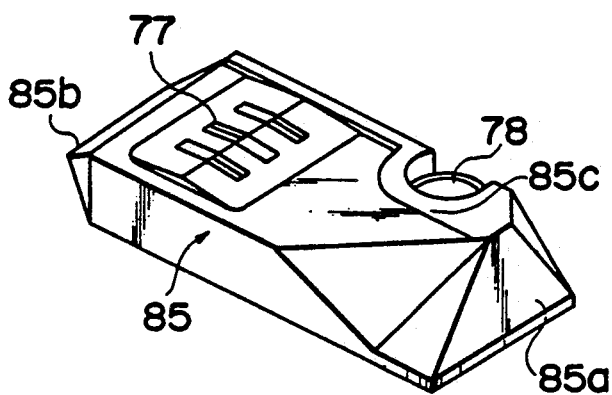
F I G. 24

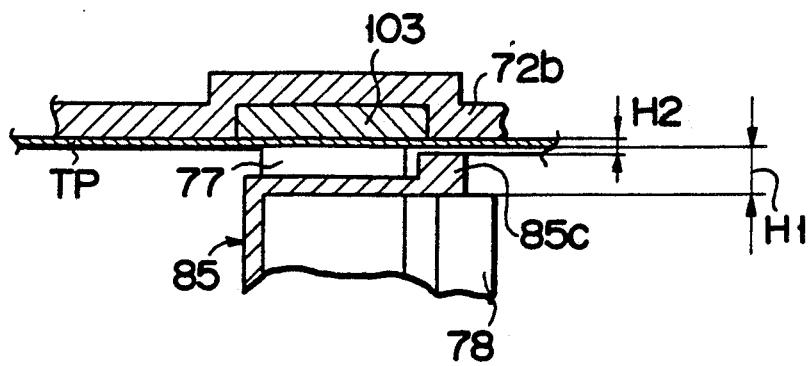
F I G. 25
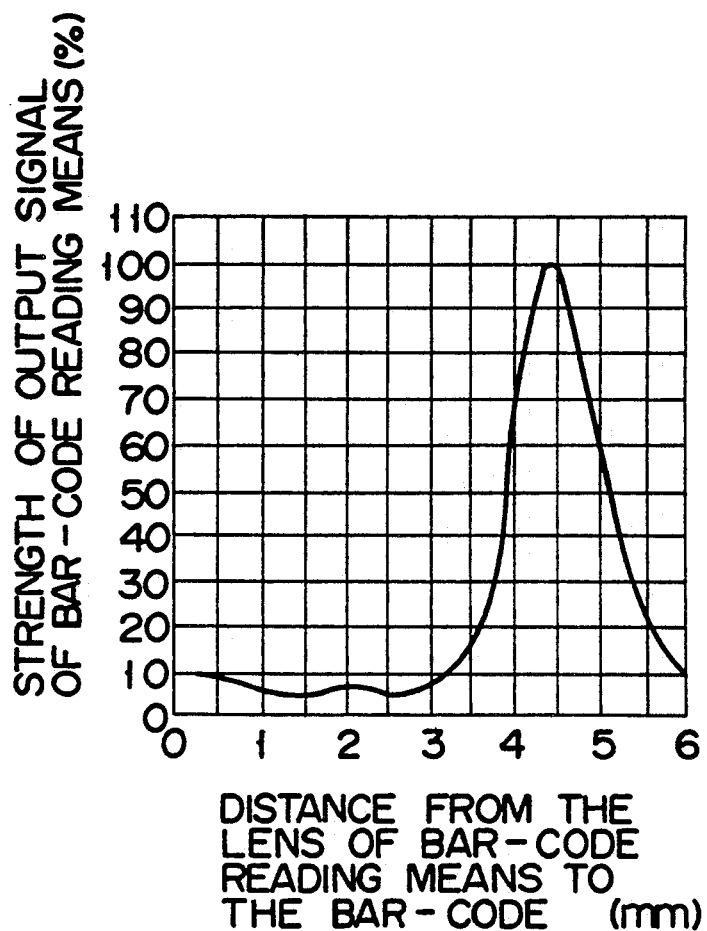
F I G. 26

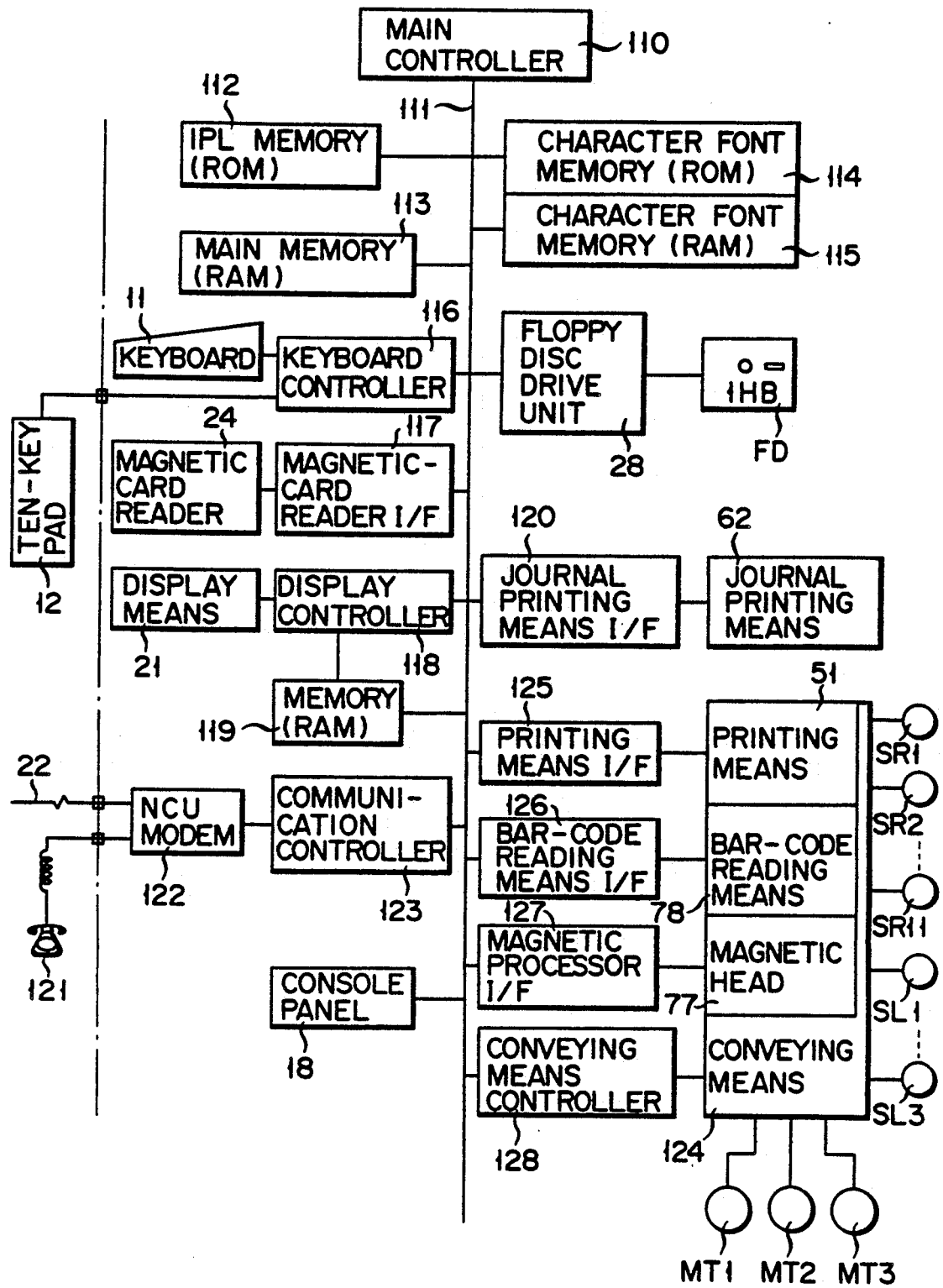
F I G. 27

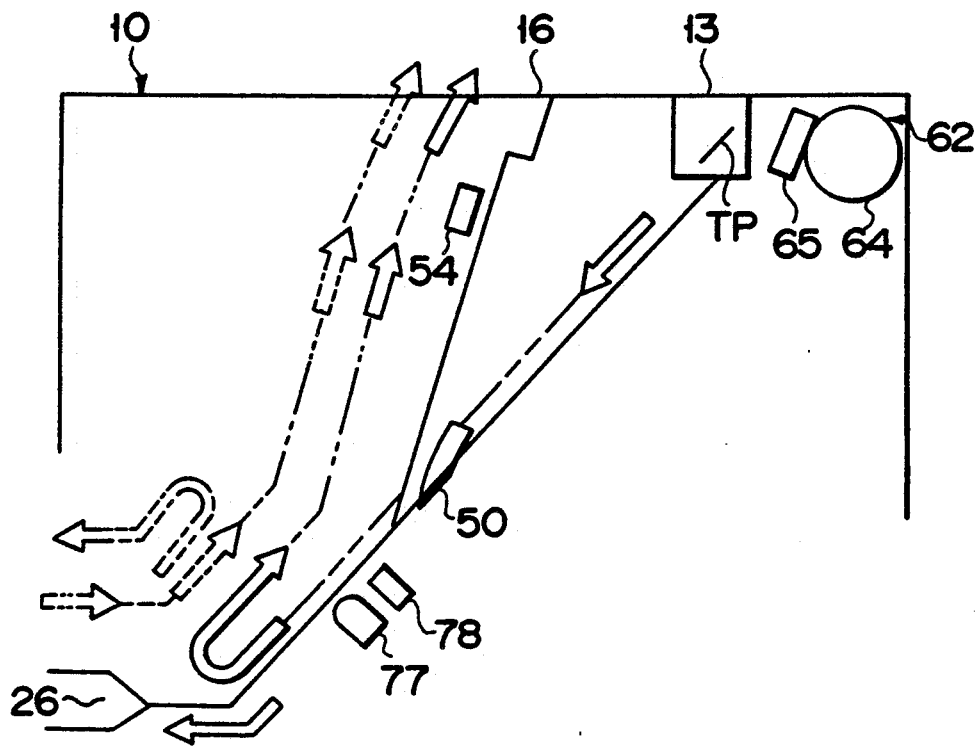
F I G. 28

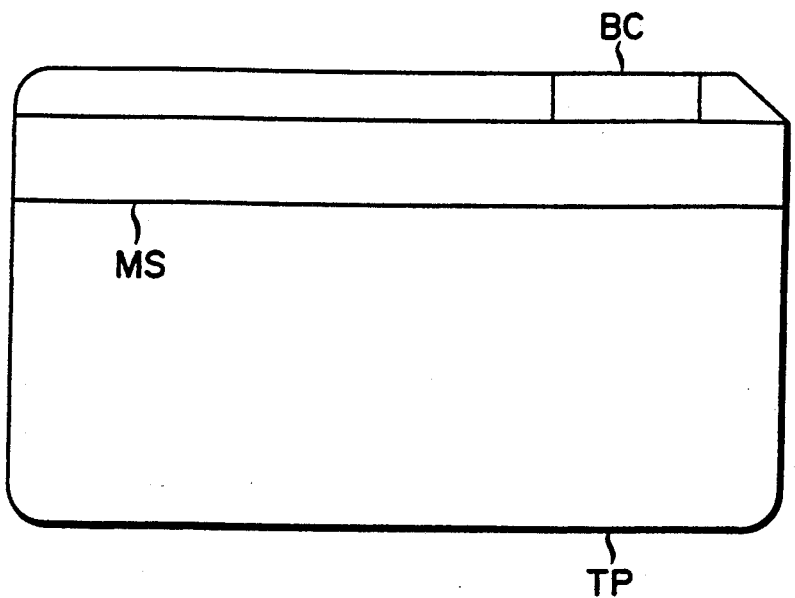
F I G. 31
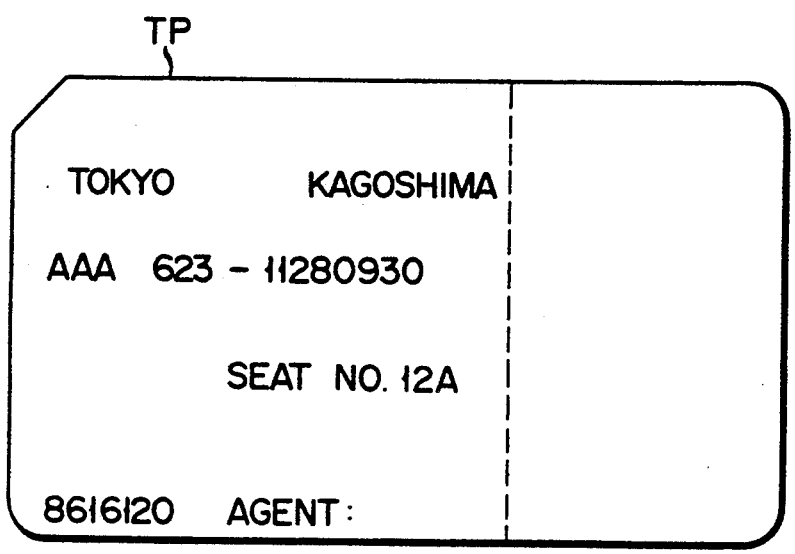
F I G. 32

TICKET CHECKING/ISSUING APPARATUS IN WHICH FRICTION HOLDS A TICKET WHILE RECORDING/REPRODUCING DATA

BACKGROUND OF THE INVENTION

1. Field of the Invention

The present invention relates to an apparatus for recording magnetic information to a recording area of a medium, in a ticket issuing apparatus for issuing a ticket on which data is recorded, and in a ticket checking apparatus for checking a ticket on which data is recorded.

2. Description of the Related Art

U.S. Pat. No. 4,900,909 granted Feb. 13, 1990 discloses a ticket checking/issuing apparatus for performing data exchange with a host apparatus through, e.g., a telephone line, and for issuing, e.g., a boarding ticket in conventional manner. In a ticket checking/issuing apparatus of this type, when a ticket is issued, a ticket to be issued is temporarily stopped in, e.g., a conveying path. In this state, a head unit having a magnetic head and a bar-code reader is moved relative to the ticket, which is stopped, so as to record and/or reproduce predetermined data.

When the head unit is moved relative to the ticket, the magnetic head is brought into sliding contact with the ticket. If the friction coefficient between the ticket and a conveying means is smaller than that between the magnetic head and the ticket, the ticket may be skewed due to the sliding contact with the magnetic head.

When an apparatus is powered and initialized, the head unit is moved to an initial position. The magnetic head in the head unit is brought into sliding contact with a conveying means, such as a guide plate. In order to protect the magnetic head from abrasion and to prevent the need for an increase in driving force of the head unit, the friction coefficient between the conveying means and the magnetic head must be decreased.

However, in the conventional apparatus, it is difficult to obtain a conveying path which satisfies the above two conflicting conditions.

SUMMARY OF THE INVENTION

The present invention has been made in consideration of the above situation, and has as its first objective to provide a ticket issuing apparatus and a ticket checking apparatus both of which solve the above-mentioned problems associated with the friction coefficients between a magnetic head and conveying means and between a ticket and the conveying means, so that skew of a ticket in a conveying path caused by sliding contact with the magnetic head can be prevented, the magnetic head can be protected from abrasion, and an increase in driving force of the head unit can be avoided.

A second objective of the present invention is to provide an apparatus for recording magnetic information to a recording area of a medium, which solves the above-mentioned problems associated with the friction coefficients between recording means, such as a magnetic head, and medium holding means and between a medium, such as a ticket, and the medium holding means, so that skew of the medium in the medium holding means caused by sliding contact with the recording means can be prevented, the recording means can be protected from abrasion, and an increase in driving force of recording means moving unit can be suppressed.

In order to achieve the above first objective, a ticket issuing apparatus for issuing a ticket on which data is recorded, comprises: holding means for holding the ticket; means for recording data on the ticket, moved along the holding means and brought into sliding contact with the ticket held by the holding means; and a friction member which is arranged on a surface of the holding means opposing the recording means, has a friction coefficient with the ticket larger than that between the recording means and the ticket, is brought into sliding contact with the recording means when the recording means is moved while the holding means does not hold the ticket, and is brought into contact with the ticket when the holding means holds the ticket.

In order to achieve the above first objective, a ticket checking apparatus for checking a ticket on which data is recorded, comprises: holding means for holding the ticket; means for reproducing data from the ticket, moved along said holding means and brought into sliding contact with the ticket held by said holding means; and a friction member which is arranged on a surface of said holding means opposing said reproducing means, has a friction coefficient between itself and the ticket larger than that between said reproducing means and the ticket, is brought into sliding contact with said reproducing means when said reproducing means is moved while said holding means does not hold a ticket, and is brought into contact with the ticket held by said holding means when said holding means holds the ticket.

In order to achieve the above second objective, an apparatus for recording magnetic information to a recording area of a medium, comprises: means for recording the magnetic information to the recording area of the medium, moved along the recording area of the medium; and means for holding the medium with a friction coefficient between itself and the medium larger than that between the recording means and the medium.

BRIEF DESCRIPTION OF THE DRAWINGS

FIGS. 2 and 3 are perspective views showing front and rear outer appearances of a ticket checking/issuing apparatus according to an embodiment of the present invention;

FIG. 4 is a front view showing a ticket insertion port of the/apparatus shown in FIG. 2;

FIG. 5 is a longitudinal sectional view schematically showing an arrangement of a main portion of the apparatus shown in FIG. 2;

FIGS. 11 to 13 are respectively a top view and left and right side views schematically showing a magnetic recording optical encoding unit shown in FIG. 5;

Figs. 16 and 17 are respectively a top view and a front view schematically showing a head driving mechanism for a head unit including a recording and/or reproducing means;

FIGS. 19 and 20 are perspective views schematically showing a parallel and separated positions of the pivotal conveying guide which is pivoted between these positions in correspondence with the position of the reciprocal held unit;

FIGS. 21 and 22 are respectively a side view and a front view schematically showing a locking member as a position regulating means for the pivotal conveying guide, in which the pivotal conveying guide is arranged at the parallel position shown in FIG. 19;

FIG. 23 is a side view schematically showing the locking member when the pivotal conveying guide is arranged at the separated position shown in FIG. 20;

FIG. 24 is a perspective view schematically showing a guide member for a magnetic head and a bar-code reading means of the head driving unit;

FIG. 25 is a sectional view schematically showing a state wherein the magnetic head of the head driving unit is brought into sliding contact with a magnetic stripe of a ticket held at a predetermined position in the ticket holding unit;

FIG. 26 is a graph showing characteristics of the bar-code reading means which are changed in accordance with a change in distance from a bar-code;

FIG. 27 is a block diagram showing an arrangement of a control system of the ticket issuing apparatus according to the embodiment of the present invention;

FIG. 28 is a schematic view showing the flow of various tickets in the apparatus according to the embodiment of the present invention;

FIGS. 31 and 32 are views schematically showing rear and front surfaces of a boarding ticket issued by the ticket checking/issuing apparatus.

DESCRIPTION OF THE PREFERRED EMBODIMENTS

An embodiment of the present invention will be described with reference to the accompanying drawings.

Figure 2:
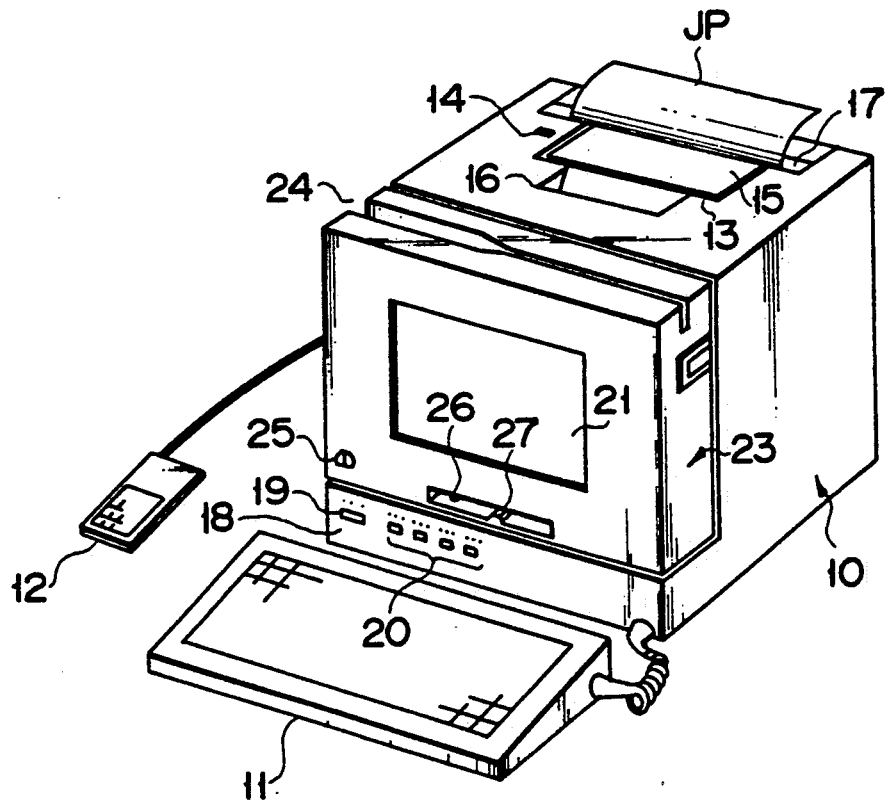

FIGS. 2 and 3 show front and rear exterior of a ticket checking/issuing apparatus which performs data exchange with a host apparatus (not shown) through a telephone line and issues a boarding ticket in a conventional manner. Apparatus main body 10 is coupled to keyboard 11 and ten-key pad 12. Data associated with issuance, reservation, verification, inquiry, and the like of a boarding ticket or the like are input to main body 10 at keyboard 11. When a customer purchases a boarding ticket using his credit card, he inputs the identification number of the credit card at ten-key pad 12 into main body 10.

Hopper 13 stores a large number of boarding tickets which are unissued, i.e., are not yet subjected to issuing processing in main body 10. Hopper 13 is arranged on the upper surface of main body 10. Cover 15 which is opened/closed by a key inserted in key hole 14 is mounted on an opening of hopper 13. Stacker 16 which stacks issued boarding tickets, i.e., after having been subjected to issuing processing in main body 10, is arranged in front of hopper 13. Journal discharge port 17 through which journal paper JP printed by a journal printing means (to be described later) is arranged behind hopper 13.

Console panel 18 is arranged on the lower portion of the front surface of main body 10. Console panel 18 has journal paper feed switch 19 for the journal paper, and lamps 20 for indicating a power on/off state, an input enable/disable state, a communication state, and an alarm.

Display means 21 comprising, e.g., a plasma display is arranged at the center of the front surface of main body 10. Display means 21 displays data input at keyboard 11, and data sent from the host apparatus (not shown) through telephone line 22 (FIG. 3). Display means 21 is mounted on display-means supporting frame 23 which is coupled to open and close in a back-and-forth direction with respect to the front surface of main body 10. Known magnetic card reader 24 for reading magnetic data of, e.g., a credit card is mounted on the upper portion of display-means supporting frame 23.

Power switch 25 and ticket insertion port 26 are arranged on the front surface of supporting frame 23. For example, a group airline ticket, a handwritten airline ticket, a credit specification recording a note of issuance of an airline ticket, and a complimentary ticket may be inserted in ticket insertion port 26. A complimentary ticket, e.g., has a size smaller than other types of ticket. Therefore, ticket insertion port 26 has an arrangement capable of positioning these tickets of various sizes.

FIG. 4 is an enlarged view of ticket insertion port 26. Width 1a of ticket insertion port 26 coincides with a dimension in the lateral (widthwise) direction of a large ticket. Guide projection 27 having a height lower than height 1c of port 26 is arranged on the lower surface of port 26 on the right side of a position coinciding with length 1b in the lateral (widthwise) direction of a small ticket from the left end face of port 26. Guide projection 27 extends toward the interior of the ticket insertion port.

With this arrangement, a large ticket such as a group airline ticket or the like is inserted in port 26 at a position above the upper surface of guide projection 27, and is guided toward the interior of port 26 by the left and right end faces of port 26. A small ticket such as a complimentary ticket is inserted between the left end face of port 26 and guide projection 27 at a position below the upper surface of guide projection 27, and is guided thereby toward the interior of port 26.

As shown in FIG. 3, main body 10 incorporates floppy disc drive unit 28 along the left side wall of its outer case. A floppy disc can be loaded/unloaded to/from unit 28 in a state wherein display-means supporting frame 23 is pivoted to an open position in front of main body 10.

FIG. 5 schematically shows an internal arrangement of main body 10.

Circuit board 30 on which a control circuit is disposed is arranged along the inner surface of a bottom wall of the outer case of main body 10. Power supply means 31 is arranged near the lower portion of the rear wall of the outer case.

A large number of unissued boarding tickets TP are stored in hopper 13 so that the edges of the tickets extending in the widthwise direction coincide with the up-and-down direction of main body 10, and their edges extending in the longitudinal direction coincide with the right-and-left direction of main body 10. These tickets TP are pressed against the rear side surface of hopper 13 by press member 32, and are picked up one by one into conveying path 34 by pickup roller 33 provided on the rear side surface. First and second conveying rollers 35 and 36 as part of a conveying means are positioned at the exit of hopper 13 and at a position separated from the exit by a predetermined distance. Insertion roller 37 as part of the conveying means is positioned near ticket insertion port 26. These first and second conveying rollers 35 and 36 and insertion roller 37 are pushed against corresponding driven rollers 38, 39, and 40. Pulleys 41, 42, 43, and 44 are respectively attached to pickup roller 33, first and second conveying rollers 35 and 36, and insertion roller 37, and belt 45 is looped around pulleys 41 to 44. Belt 45 is also looped on pulley 46 attached to the output shaft of motor MT1. Pickup roller 33, first and second conveying rollers 35 and 36, and insertion roller 37 are driven by motor MT1.

Spring clutches (not shown) are interposed between pickup roller 33 and corresponding pulley 41 and between first conveying roller 35 and corresponding pulley 42. When stopper members 1a and 2a driven by first and second solenoids SL1 and SL2 are engaged with the spring clutches, pickup roller 33 and first conveying roller 35 slip on pulleys 41 and 42 upon operation of the spring clutches.

Stopper member 47 for positioning and temporarily holding a boarding ticket fed from hopper 13 or ticket insertion port 26 in cooperation with insertion roller 37 is interposed between second conveying roller 36 and insertion roller 37. Stopper member 47 is driven by third solenoid SL3. Stopper member 47 and third solenoid SL3 are provided in magnetic recording/optical encoding unit 48 including a bar-code reader and a magnetic data reading/writing device. Magnetic recording/ optical encoding unit 48 will be described in detail later.

Sensor SR10 for detecting the presence/absence of tickets TP is mounted on hopper 13. Sensor SR1 for detecting feeding of ticket TP from hopper 13 into conveying path 34 is arranged between first and second conveying rollers 35 and 36. Ticket holding unit (ticket holding means) 72 arranged between rollers 36 and 37 and sensor SR2 for detecting the presence/absence of a ticket are arranged between rollers 36 and 37. Sensor SR2 has light-emitting diode LD1 mounted on magnetic recording/optical encoding unit 48 and photodiode PD1 mounted on main body 10. Sensor SR3 for detecting insertion of a ticket at ticket insertion port 26 is arranged between ticket insertion port 26 and insertion roller 37.

Branch path 49 constituted by a ticket conveying means such as a guide is arranged near second conveying roller 36 on the side of first conveying roller 35. Selector gate 50 is arranged between branch path 49 and conveying path 34. Selector gate 50 is biased by its own weight to project into conveying path 34. Ticket TP picked up from hopper 13 into conveying path 34 pushes up selector gate 50, and is conveyed into ticket holding unit 72 between rollers 36 and 37. A ticket which has been processed by magnetic recording/optical encoding unit 48 is picked up from ticket holding unit 72 by rollers 36 and 39 since the output shaft of motor MT1 is rotated in the reverse direction, and is guided into branch path 49 by selector gate 50. Printing means 51 is arranged at the trailing end (upper end) of branch path 49.

Printing means 51 is constituted by platen roller 52 and thermal head 54 which is in contact with platen roller 52 through ink ribbon 53. Ink ribbon 53 is housed in ribbon cassette 55. Pulley 56 is coupled to platen roller 52 through a one-way clutch (not shown). Belt 57 looped on pulley 56 is also looped on pulleys 58 and 59, and pulley 59 is fixed to the output shaft of motor MT3 arranged at the same position as motor MT1. When the output shaft of motor MT3 is rotated in one direction, platen roller 52 is rotated; when rotated in the other direction, roller 52 is not rotated. Idler gear 60 meshed with input gear 61 for driving ink ribbon 53 is meshed with a gear coaxial with pulley 56, and ink ribbon 53 is also driven by the output shaft of motor MT3. A ticket on which predetermined data is printed by printing means 51 is fed into stacker 16.

Sensor SR6 for detecting a ticket fed into branch path 49 and outputting a print start signal is arranged along branch path 49. Ink ribbon detection sensor SR7 is arranged along the leading portion of ink ribbon 53 at the upstream side of thermal head 54.

Journal printing means 62 is arranged near pulley 58 disposed above the rear end portion of main body 10. Platen driving gear 63 is meshed with a gear coaxial with pulley 58. Gear 63 is coupled to platen roller 64 through a one-way clutch (not shown). When the output shaft of motor MT3 is rotated in one direction, platen roller 64 is not rotated upon operation of the one-way clutch; when rotated in the other direction, is rotated. Thermal sensitive journal paper JP is pressed against platen roller 64 by thermal head 65. Thermal head 65 records predetermined data on journal paper JP. Printed journal paper JP is discharged from journal discharge port 17 on the upper surface of main body 10 to the outside. Journal paper detection sensor SR11 for detecting the presence/absence of journal paper JP in journal printing means 62 is provided to journal printing means 62.

Figure 6:
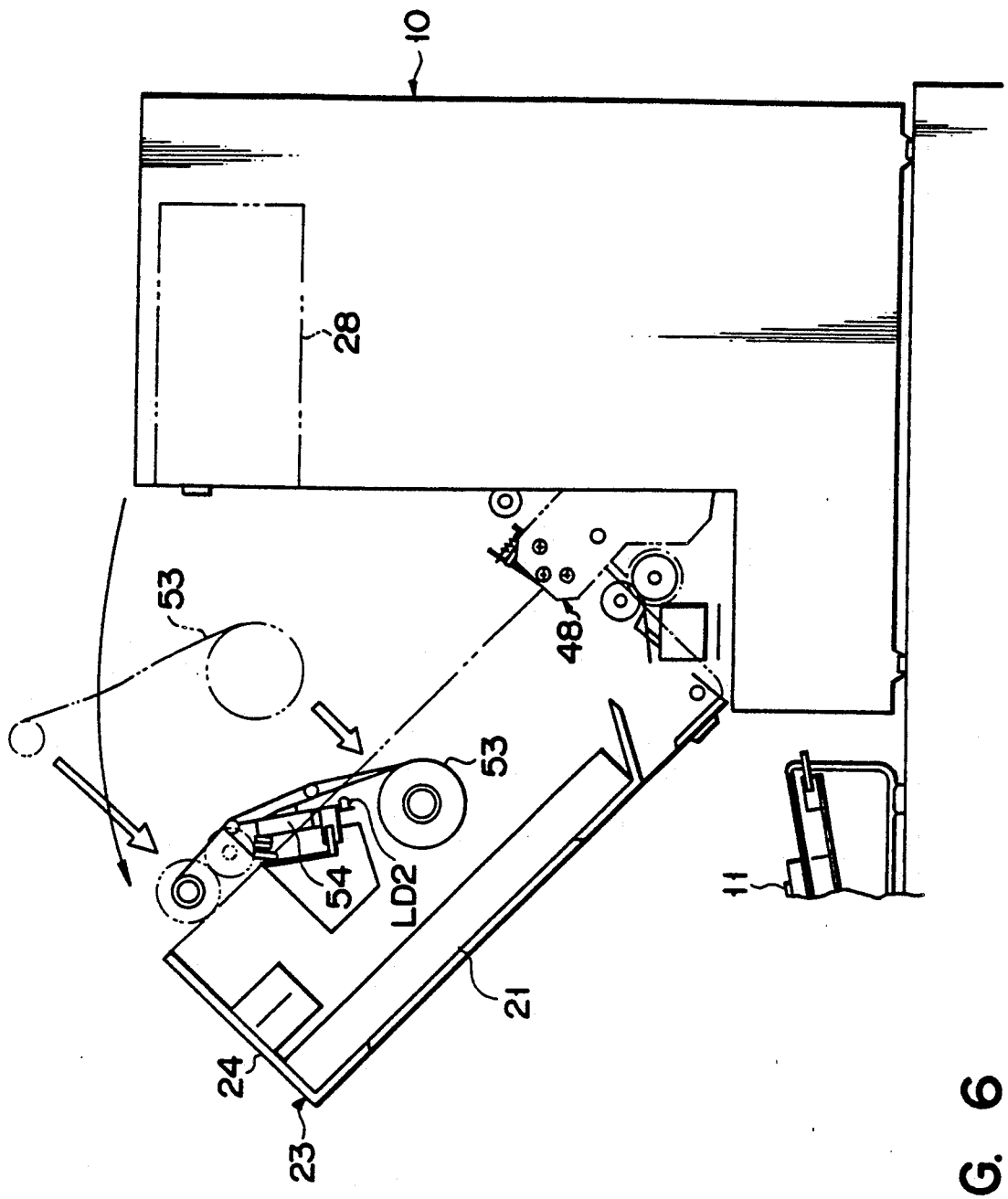
FIG. 6 is a schematic side view for explaining a function of a display-means supporting frame shown in FIG. 5.

Platen roller 52 of printing means 51 is provided to main body 10, and thermal head 54, ink ribbon 53, idler gear 60, input gear 61, and light-emitting diode LD2 constituting ink ribbon detection sensor SR7 are provided to display-means supporting frame 23 arranged in main body 10. Therefore, as shown in FIG. 6, when frame 23 is moved to an open position, ink ribbon 53 can be easily replaced.

The arrangements of the constituting components will be described hereinafter.

Figure 9:
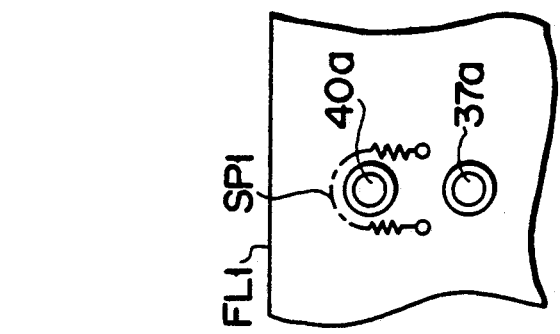
FIGS. 7 to 9 are respectively a top view, a front view, and a side view schematically showing an arrangement of an insertion roller and a driven roller corresponding to the ticket insertion port shown in FIG. 5.
Figure 7:
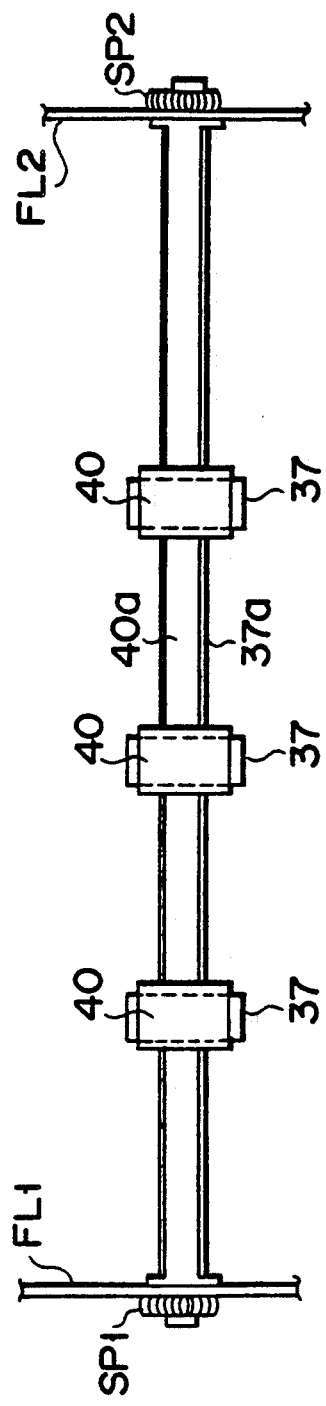
Figure 8:
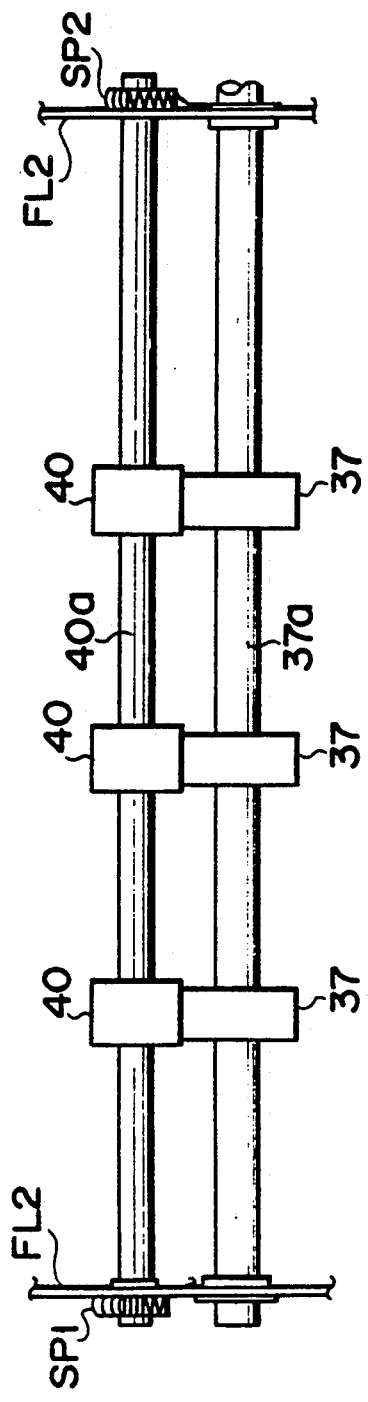

FIGS. 7 to 9 schematically show the arrangements of insertion roller 37 and driven roller 40. A plurality of insertion rollers 37 are arranged at equal intervals along shaft 37a which is rotatably supported between frames FL1 and FL2. A plurality of driven rollers 40 are arranged at equal intervals along shaft 40a which is rotatably supported between frames FL1 and FL2. Coil springs SP1 and SP2 are mounted on the outer side surfaces of frames FL1 and FL2 to be wound around the peripheral surface of shaft 40a. Shaft 40a of driven rollers 40 is provided with a predetermined rotational resistance by coil springs SP1 and SP2.

Insertion rollers 37 have conveying power enough to fetch a ticket inserted in ticket insertion port 26 on the front surface of main body 10 into main body 10. As will be described later, when data is recorded and/or reproduced on and/or from ticket TP fed from hopper 13, insertion rollers 37 are rotated so that the trailing end (upper end) of ticket TP is brought into contact with positioning stopper member 47 in unit 48. Insertion rollers 37 after the contact operation was performed must slip on ticket TP. In order to achieve the conflicting functions, in this embodiment, insertion rollers 37 are formed of silicone rubber.

Figure 10:
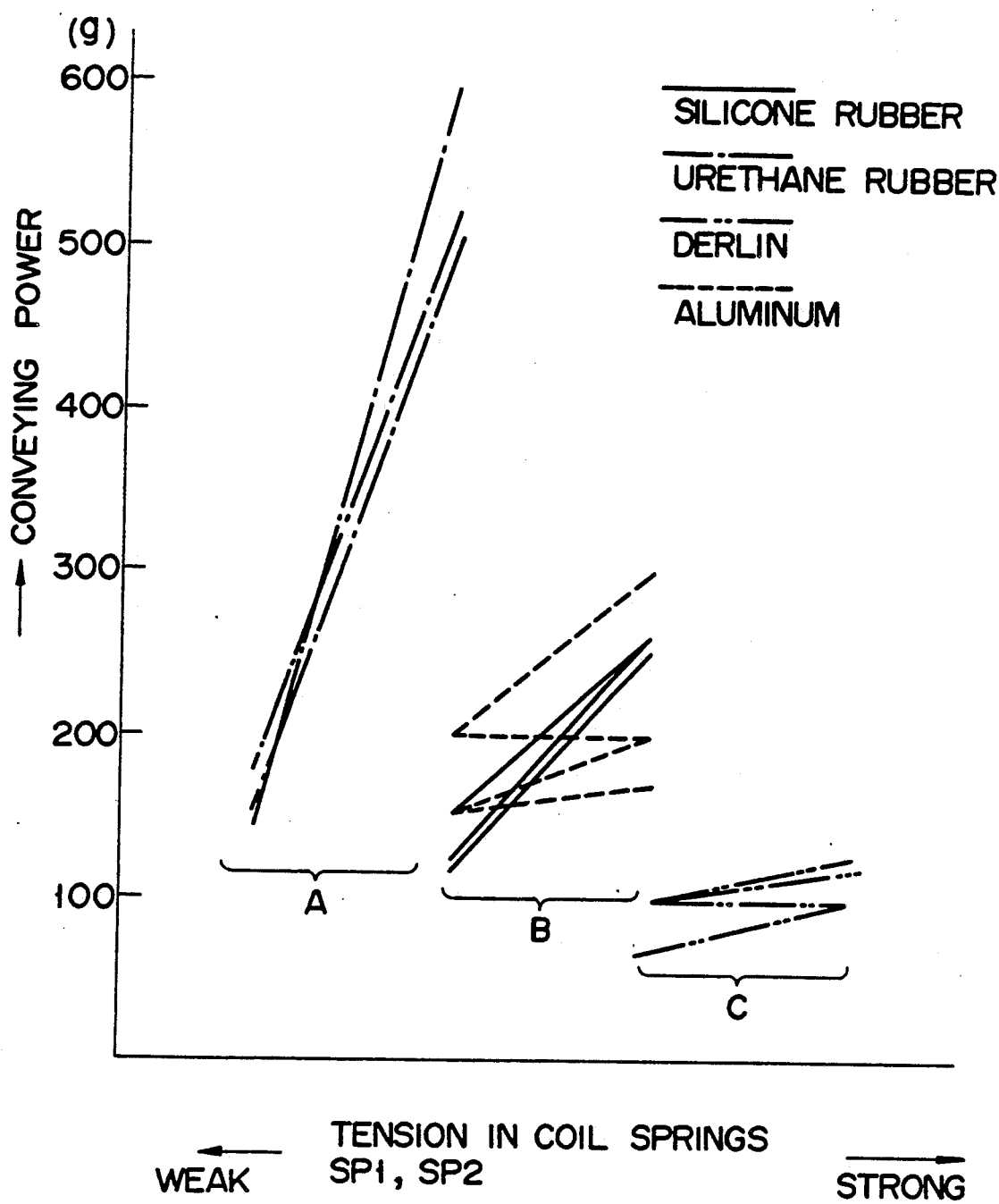
FIG. 10 is a view showing conveying powers of insertion rollers of various materials when these insertion rollers are combined with coil springs with various tensions and the tensions of the coil springs are changed.

FIG. 10 schematically shows conveying powers generated by insertion rollers 37 of different materials when three types A, B, and C of coil springs SP1 and SP2 having different tensions (the relationship of their tensions is A<B<C) are prepared and coil springs SP1 and SP2 of different types are used. In FIG. 10, "Derlin" is a trade name of an acetal resin available from Du Pont de Nemours, E.I., Co.

As can be seen from FIG. 10, when coil springs SP1 and SP2 of the same type are used, if a tension loaded to coil springs SP1 and SP2 is increased (i.e., braking power to driven rollers 40 is increased), the conveying power of insertion rollers 37 is increased. FIG. 10 reveals that silicone is a material which has a smallest variation in conveying force due to a material of a ticket, contacting insertion rollers 37, and a variation in tension loaded to coil springs SP1 and SP2. Since the silicone rubber has elasticity, an appropriate friction force can be generated between itself and a ticket as compared to a metal such as aluminum. Therefore, silicone rubber is the best material for insertion rollers 37.

Magnetic recording/optical encoding unit 48 will be described below with reference to FIGS. 11 to 13.

Magnetic recording/optical encoding unit 48 comprises head driving unit 71 provided with the magnetic head and the like, and ticket holding unit (ticket holding means) 72 arranged above head driving unit 71 and constituting part of conveying path 34.

Figure 11:
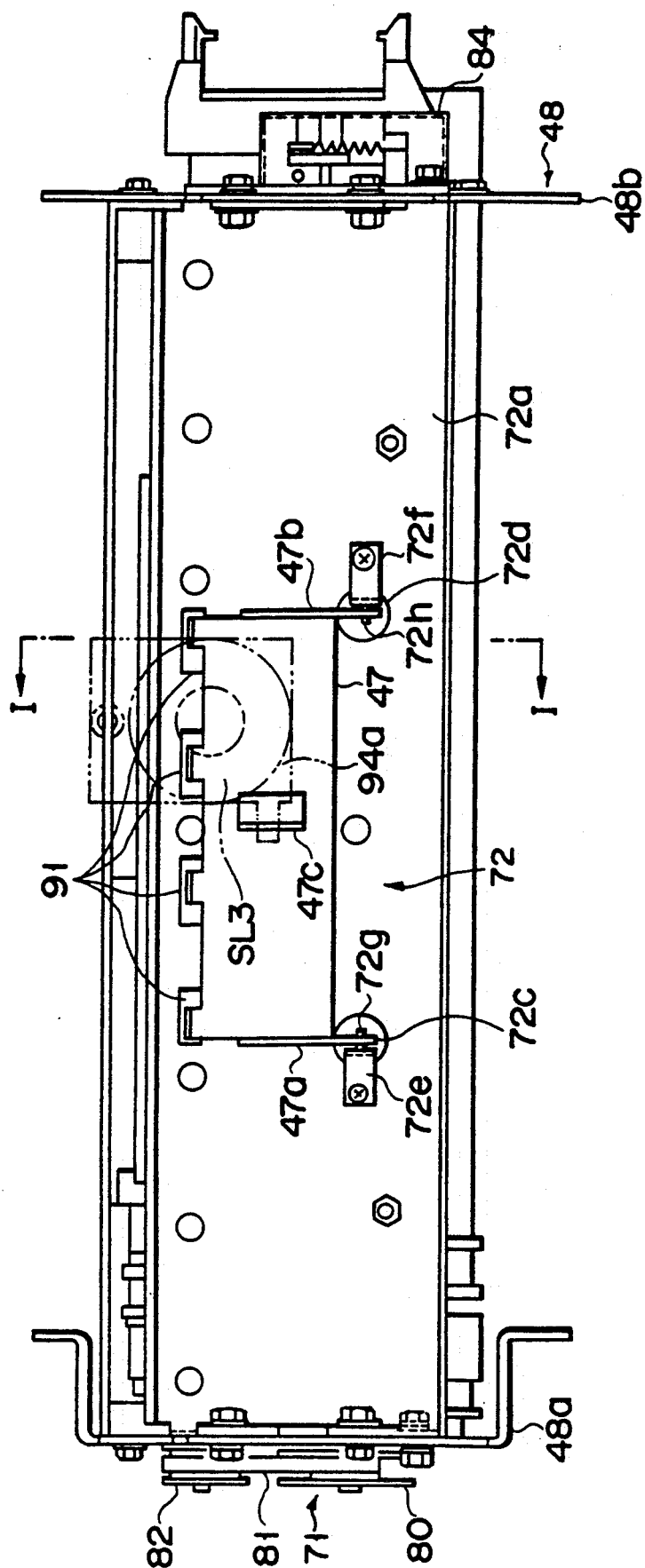

As shown in FIG. 11, ticket holding unit 72 comprises frame 72a. Frame 72a is supported between side frames 48a and 48b of magnetic recording/optical encoding unit 48. As shown in FIG. 12, first stationary conveying guide 72b constituting part of conveying path 34 is arranged on the lower surface of frame 72a. Stopper member 47 is arranged on the upper surface of frame 72a. Supporting portions 47a and 47b are provided at two ends in the longitudinal direction of stopper member 47. The distal end sections of supporting portions 47a and 47b are inserted in through holes 72c and 72d formed in frame 72a and through holes (not shown) formed in first stationary conveying guide 72b.

The free end portions of holding members 72e and 72f fixed to frame 72a are also inserted in through holes 72c and 72d. Supporting portions 47a and 47b of stopper member 47 are pivotally held by shafts 72g and 72h fixed at the free end portions of holding members 72e and 72f. A plurality of pawls formed at the leading edge of stopper member 47 are inserted in a plurality of through holes 91 formed in frame 72a and a plurality of through holes formed in first stationary conveying guide 72b and pivotal conveying guide 96 (to be described later) in correspondence with through holes 91. The plurality of pawls shut off conveying path 34 in ticket holding unit 72 defined between stationary conveying guide 72b and pivotal conveying guide 96.

Figure 14:
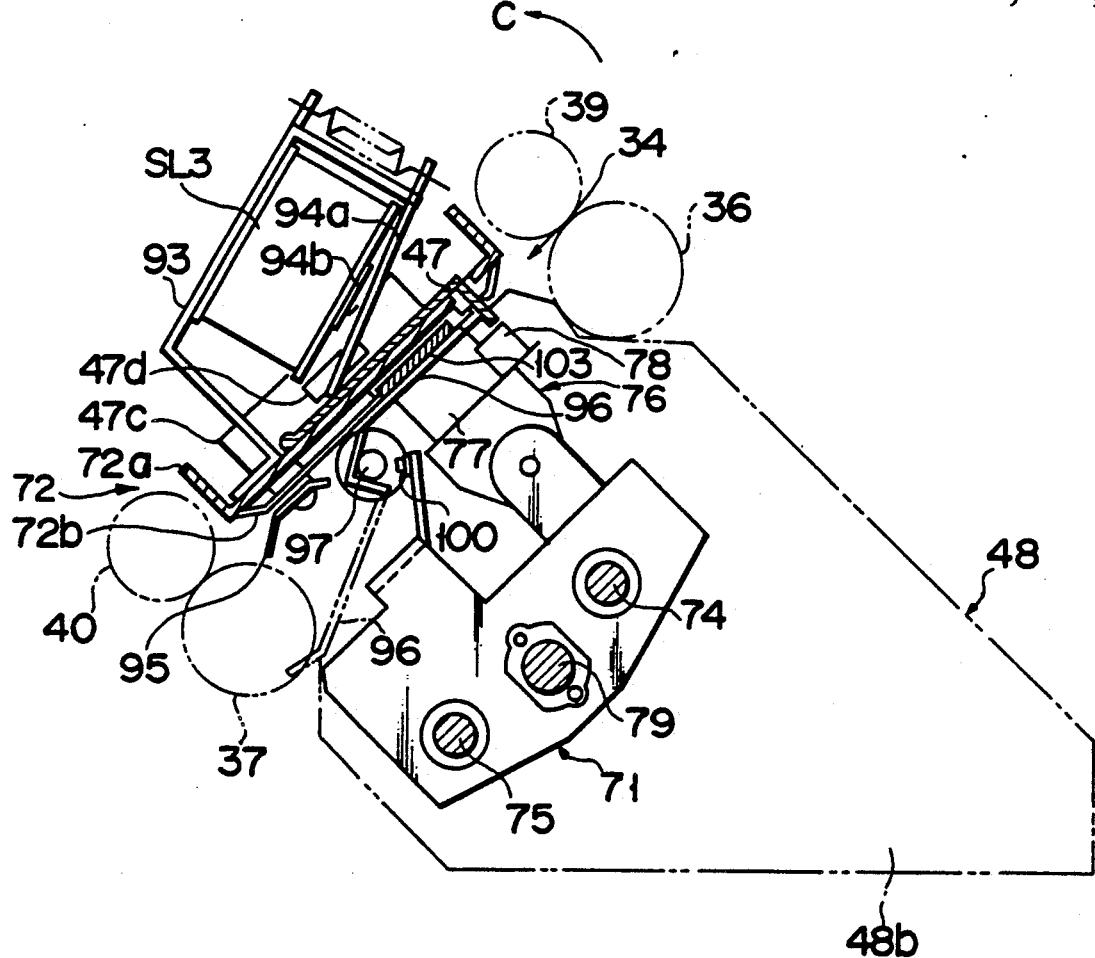
FIG. 14 is a schematic sectional view taken along a line I—I in FIG. 11, in which a ticket holding unit as ticket holding means, a magnetic head as recording and/or reproducing means, and a friction member are shown, and those means and member are main constituting components of this invention.

As shown in FIG. 14, third solenoid SL3 is arranged above ticket holding unit 72. Third solenoid SL3 is mounted on holding member 93 arranged on the upper surface of frame 72a. The distal end portion of planar actuator 94a combined with third solenoid SL3 is engaged with through hole 47d of engaging plate 47c projecting upright on the central portion of stopper member 47.

When third solenoid SL3 is deenergized, the distal end portion of actuator 94a is biased by a spring to be separated from iron core 94b of third solenoid SL3, as shown in FIG. 14. Actuator 94a presses stopper member 47 on the upper surface of frame 72a, so that the plurality of pawls of the free end portion of stopper member 47 is inserted in conveying path 34 in ticket holding unit 72.

When third solenoid SL3 is energized, actuator 94a is attracted by iron core 94b against the biasing force of the spring. Therefore, stopper member 47 is pivoted in a direction indicated by arrow C in FIG. 14, and the plurality of pawls of its free end portion is drawn out from conveying path 34.

Figure 15:
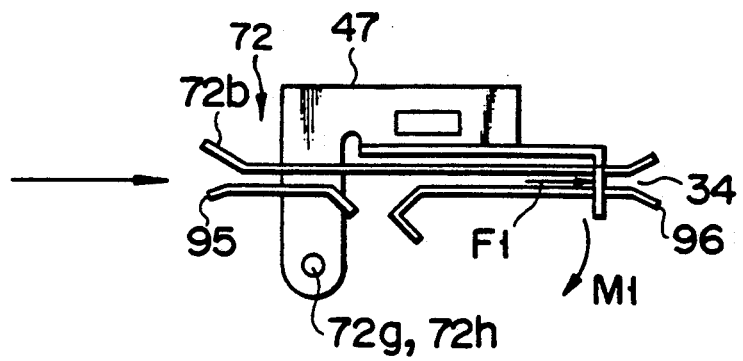
FIG. 15 is a schematic side view for explaining a function of a stopper member in a ticket holding unit shown in FIG. 14.

FIG. 15 schematically shows only conveying path 34 in ticket holding unit 72 and stopper member 47.

When magnetic recording/optical encoding unit 48 records and/or reproduces data on/from ticket TP from hopper 13 or a ticket from ticket insertion port 26, insertion rollers 37 and driven rollers 40 are rotated so that ticket TP or the ticket from the insertion port is brought into contact with the pawls of the free end portion of stopper member 47, as described above. The conveying power of insertion rollers 37 is transmitted to the pawls of the free end portion of stopper member 47 through the ticket. When the power indicated by arrow F1 acts on the pawls of the free end of stopper member 42, a rotational moment is generated in stopper member 47. In this embodiment, since pivotal centers 72g and 72h of stopper member 47 are provided on the same side as the pawls of the free end portion of stopper member 47 with respect to conveying path 34, as shown in FIG. 15, moment acts in a direction indicated by reference symbol M1, i.e., a direction in which stopper portion 47 projects its pawls into conveying path 34. Therefore, the end portion of ticket TP or the ticket from the insertion port can be prevented from being rolled up by the pawls of the free end of stopper member 47, and position precision of ticket TP or the ticket from insertion port 26 in conveying path 34 in ticket holding unit 72 can be improved.

Head driving unit 71 will be described hereinafter.

Figure 17:
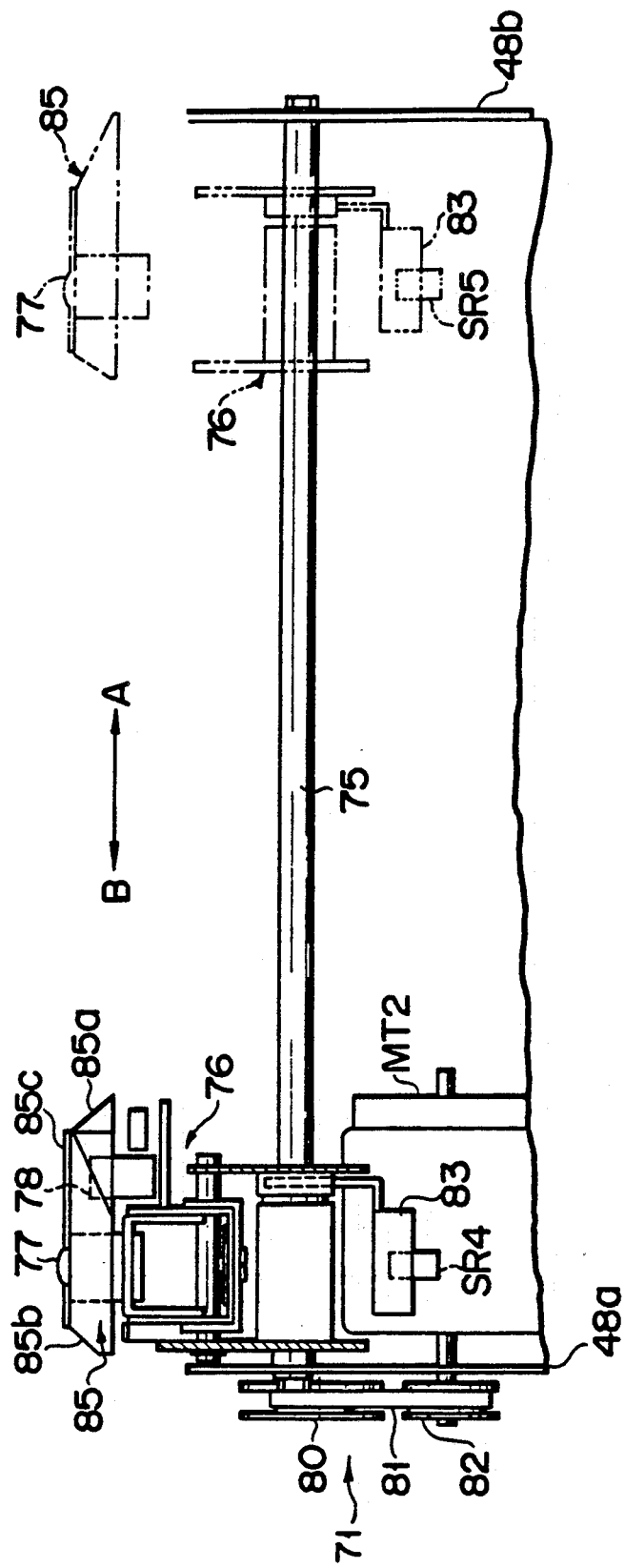

FIGS. 16 and 17 schematically show the plan and front views of head driving unit 71. Head driving unit 71 has a pair of guide shafts 74 and 75 which extend between a pair of side frames 48a and 48b of magnetic recording/optical encoding unit 48. Head unit 76 is movably arranged on guide shafts 74 and 75. Head unit 76 is provided with magnetic head (recording and/or reproducing means) 77, and bar-code reading means 78. Magnetic head 77 is a combination head, and has reading, writing, and verifying (read after write) functions. Head 77 can execute the above-mentioned functions in either moving direction of head unit 76. Magnetic head 77 can cope with a magnetic stripe having two types of high and low coercive forces of 2750 Oe and 650 Oe. Bar-code reading means 78 is constituted by a light-emitting diode and a phototransistor (neither are shown). Magnetic head 77 and bar-code reading means 78 are arranged in correspondence with magnetic stripe MS and bar-code BC printed on the rear surface of ticket TP indicated by a two-dot chain line in FIG. 16 and held by stopper member 47 at the predetermined position in ticket holding unit 72.

Lead screw 79 extending from one to the other of the pair of side frames 48a and 48b of unit 48 along guide shafts 74 and 75 is arranged between guide shafts 74 and 75. Lead screw 79 is threadably engaged with head unit 76. One end portion of lead screw 79 projecting from one side frame 48a is coupled to pulley 80. Belt 81 is looped between pulley 80 and pulley 82 coupled to the output shaft of motor MT2. Therefore, head unit 76 is moved in directions indicated by arrows A and B shown in FIGS. 16 and 17 in accordance with the rotational direction of the output shaft of motor MT2. A maximum moving range of head unit 76 along guide shafts 74 and 75 is detected when light shielding member 83 attached on head unit 76 shields home position sensor SR4 and end position sensor SR5 which are arranged near two end portions in the longitudinal direction of guide shafts 74 and 75 and comprise photocouplers.

Figure 12:
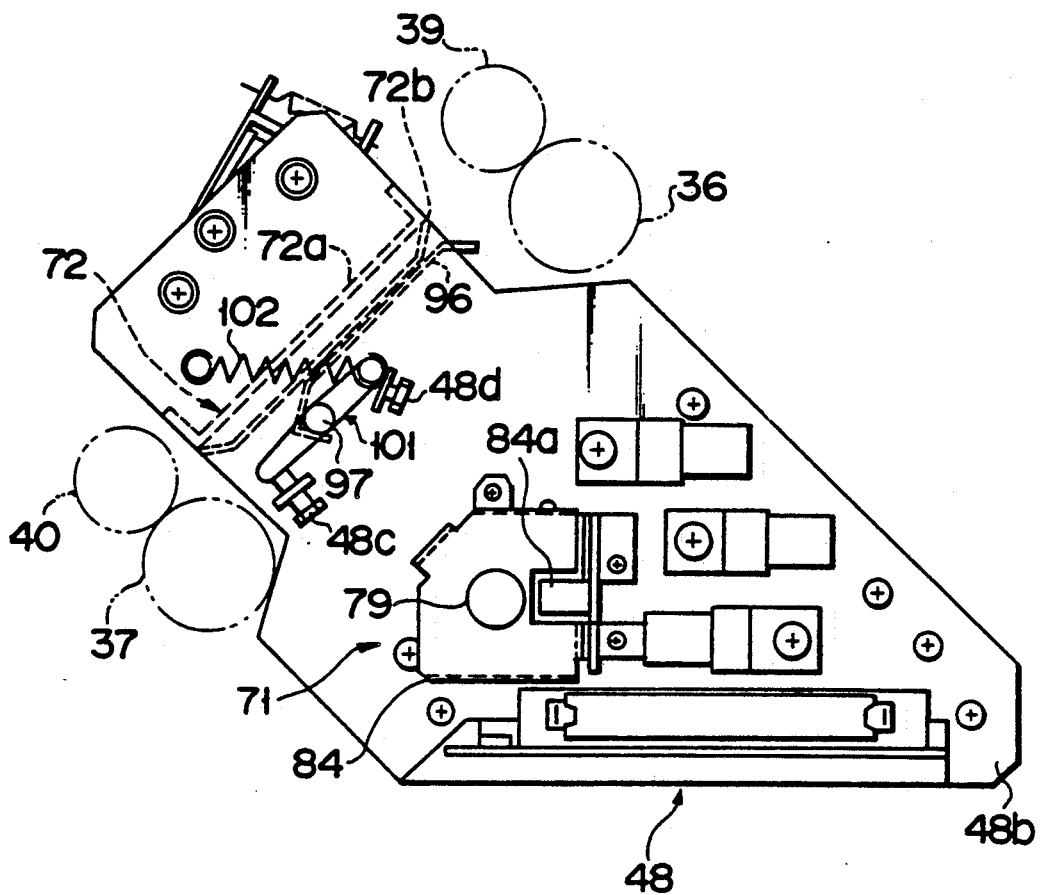

As shown in FIGS. 12 and 16, encoder 84 is arranged at the end portion of screw 79 which projects into the outer surface of the other side frame 48b. In this embodiment, encoder 84 is constituted by a disc (not shown) provided with a plurality of radially extending slits at equal angular intervals along its circumference, and photocoupler 84a for detecting the slits. The position of magnetic head 77 within the maximum moving range is controlled by utilizing the output signal from encoder 84.

Guide member 85 is provided in correspondence with the upper surfaces of magnetic head 77 and bar-code reading means 78. Guide member 85 is brought into contact with ticket TP indicated by a two-dot chain line in FIG. 16 and held by stopper member 47 at the predetermined position in ticket holding unit 72, and allows smooth movement of head unit 76 along ticket TP. Guide member 85 holds ticket TP at the predetermined position in ticket holding unit 72 in place of pivotal conveying guide 96 (to be described later in detail) during movement of head unit 76.

Figure 18:
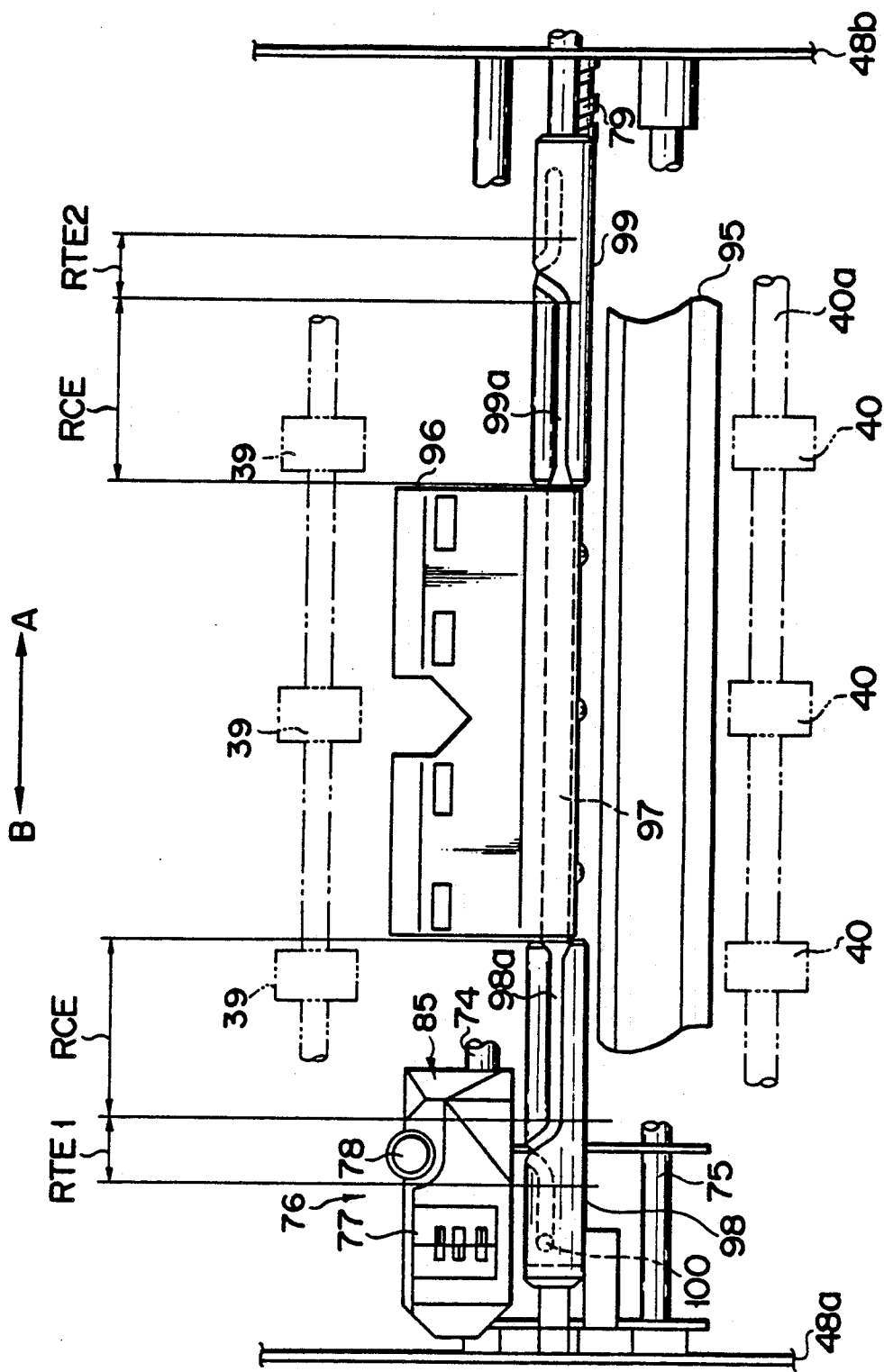
FIG. 18 is a top view schematically showing an arrangement of a pivotal conveying guide constituting a part of the ticket conveying means in the ticket holding unit.

Second stationary conveying guide (leaf spring) 95 and pivotal conveying guide 96 which constitute part of conveying path 34 in ticket holding unit 72 together with first stationary conveying guide 72b, are provided along first stationary conveying guide 72b between guide 72b and head driving unit 71, as shown in FIGS. 14 and 18. Pivotal conveying guide 96 is arranged at a position parallel to first stationary conveying guide 72b when a ticket is conveyed, as shown in FIGS. 14 and 15.

Ticket TP conveyed along conveying path 34 of first stationary conveying guide 72b and pivotal conveying guide 96 is stopped at the predetermined position by stopper member 47. When data is recorded and/or reproduced on and/or from ticket TP by magnetic head 77 and bar-code reading means 78 provided in head unit 76, pivotal conveying guide 96 is pivoted to a position so as not to interfere with the movement of head unit 76, as indicated by a two-dot chain line in FIG. 14.

The edge portion of pivotal conveying guide 96 adjacent to second stationary conveying guide 95 is held by shaft 97 in order to perform the above pivotal motion. The two end portions of shaft 97 are respectively large-diameter portions 98 and 99. Grooves 98a and 99a as guide means extending along the axial direction are formed in large-diameter portions 98 and 99. Grooves 98a and 99a first extend from positions adjacent to the two side edges of pivotal conveying guide 96 toward the corresponding ends of large-diameter portions 98 and 99, and are then bent toward a radially opposite side on the peripheries of large-diameter portions 98 and 99. Grooves 98a and 99a then extend again toward the corresponding ends of the portions 98 and 99 on the radially opposite side. Circumferentially extending portions of grooves 98a and 99a extending by about 180° in the circumferential direction on the peripheries of large-diameter portions 98 and 99 will be referred to as rotary driving regions RTE1 and RTE2 hereinafter, respectively. Axially extending portions of grooves 98a and 99a between the positions adjacent to the two side edges of pivotal conveying guide 96 and rotary driving regions RTE1 and RTE2 will be referred to as recording regions RCE hereinafter. Engaging pin 100 fixed to head unit 76 which is stopped at the home position shown in FIG. 18 is engaged with groove 98a. When head unit 76 is arranged at the home position, as shown in FIG. 18, pivotal conveying guide 96 is substantially parallel to first stationary conveying guide 72b, as indicated by a solid line in FIG. 14.

Figure 19:
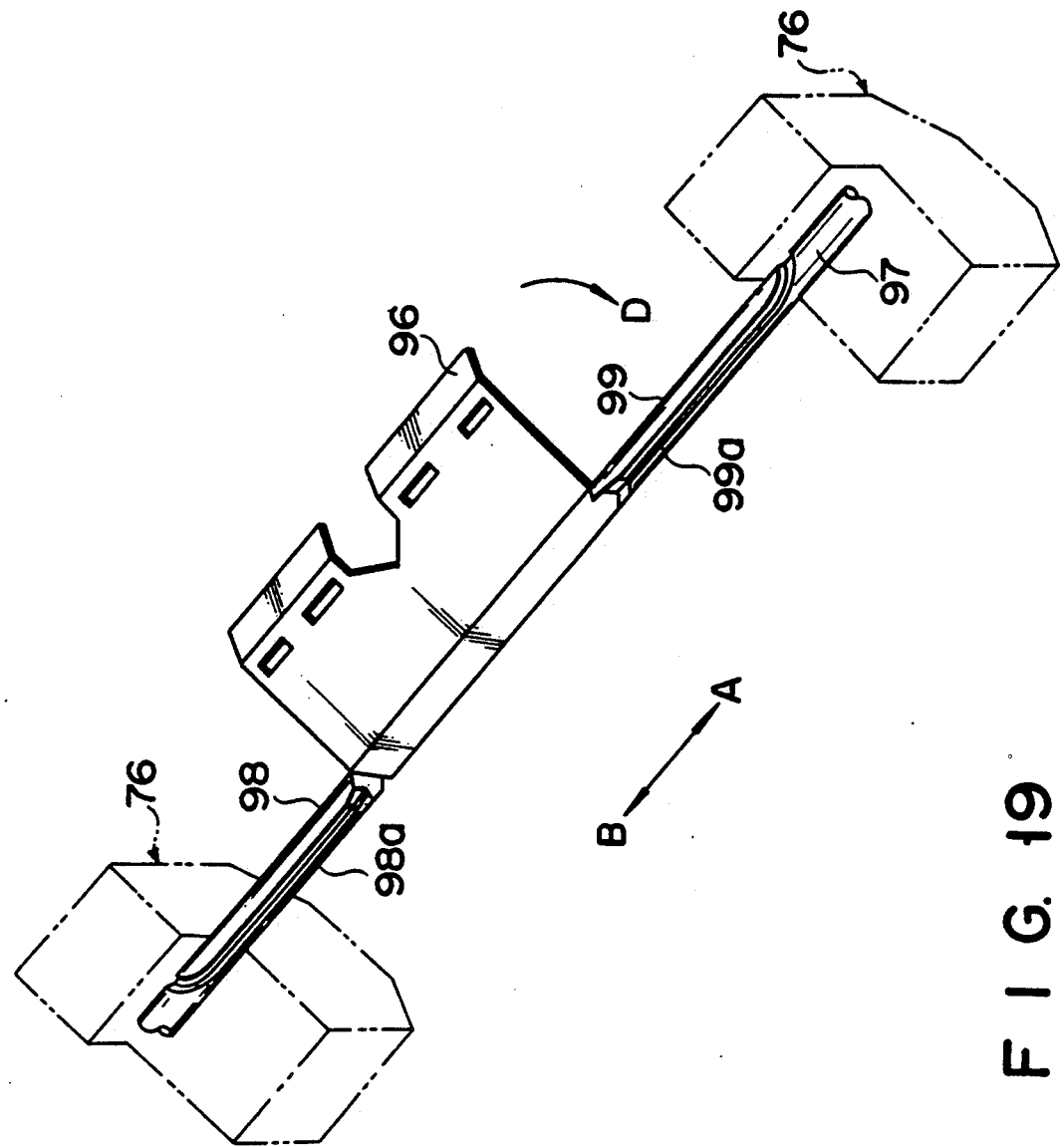

While head unit 76 is moved from the home position shown in FIG. 18 in the direction of arrow A in FIG. 18 by lead screw 79 to record and/or reproduce data on and/or from ticket TP which is held at the predetermined position in ticket holding unit 72, engaging pin 100 of head unit 76 passes through rotary driving region RTE1 of groove 98a so that shaft 97 is pivoted in a direction of arrow D in FIG. 19 together with pivotal conveying guide 96. Upon this pivotal motion, pivotal conveying guide 96 is separated from first stationary conveying guide 72b, as indicated by a two-dot chain line in FIG. 14, and the movement of head unit 76 is not interfered by pivotal conveying guide 96.

Engaging pin 100 of head unit 76 moving as described above, is further moved along recording region RCE of groove 98a of large-diameter portion 98 so that engaging pin 100 goes out from recording region RCE of groove 98a, and is then engaged with recording region RCE of groove 99a of large-diameter portion 99. When engaging pin 100 passes through rotary driving region RTE2 of groove 99a, shaft 97 is pivoted in a direction of arrow E in FIG. 20 together with pivotal conveying guide 96, and is returned from the separated position indicated by the two-dot chain line in FIG. 14 to the parallel position indicated by the solid line. When head unit 76 which was moved to the position (end position) corresponding to the terminal end of large-diameter portion 99 of shaft 97 is returned toward the home position, pivotal conveying guide 96 is pivoted in an opposite way to that described above.

When pivotal conveying guide 96 is arranged at a position parallel to first stationary conveying guide 72b as indicated by the solid line in FIG. 14, a distance between guides 96 and 72b must be kept constant. When pivotal conveying guide 96 is pivoted from the parallel position to the separated position indicated by the two-dot chain line in FIG. 14, pivotal conveying guide 96 must also be accurately held at the separated position to reliably engage engaging pin 100 of head unit 76 with the other groove 99a after it is temporarily removed from groove 98a, and pivotal conveying guide 96 arranged at the separated position does not interfere with the travel of head unit 76. For this purpose, shaft 97 to which pivotal conveying guide 96 is attached is provided with a means for accurately setting the parallel and separated positions of pivotal conveying guide 96.

FIGS. 21 and 22 show the above-mentioned position setting means.

In FIGS. 21 and 22, the central portion of elongated locking member 101 in the longitudinal direction is fixed to the outwardly projecting end of shaft 97 projecting outwardly from side frame 48b. When viewed from the top, as can be seen from FIG. 22, locking member 101 has a crank shape. First and second contact members 48c and 48d are mounted on the outer surface of side frame 48b, which are in contact with one end portion of locking member 101 when pivotal conveying guide 96 is located at the parallel and separated positions. The other end portion of locking member 101 is coupled to one end of tension coil spring 102, the other end of which is fixed to side frame 48b. As shown in FIG. 21, when pivotal conveying guide 96 is located at the position parallel to first stationary conveying guide 72b, one end portion of locking member 101 is brought into contact with first contact member 48c, as best illustrated in FIG. 22. This state is maintained by the biasing force of tension coil spring 102.

As shown in FIG. 23, when pivotal conveying guide 96 is located at the position separated from first stationary conveying guide 72b, one end portion of locking member 101 is brought into contact with second contact member 48d. This state is also maintained by the biasing force of tension coil spring 102.

Guide member 85 arranged for magnetic head 77 and bar-code reading means 78 of head unit 76 (FIGS. 16 and 17) will be explained below.

FIG. 24 is an enlarged view of guide member 85. Inclined surfaces 85a and 85b are formed at two ends of guide member 85 in the moving direction of head unit 76. When head unit 76 is moved for recording and/or reproduction, inclined surfaces 85a and 85b prevent guide member 85 from being caught by the edge of ticket TP held at the predetermined position in ticket holding unit 72. When a bar-code printed on the rear surface of ticket TP is read by bar-code reading means 78, a distance between a lens surface (upper end face in FIG. 24) of bar-code reading means 78 and bar-code region BC on the rear surface of ticket TP at the predetermined position in ticket holding unit 72 must be kept constant for the following reason.

This is because, as shown in FIG. 26, the output signal from bar-code reading means 78 becomes maximum when the distance to an object to be read is equal to a given value. Even if this value is deviated by +0.5 mm, the output signal is immediately decreased, and reading precision of bar-code reading means 78 is degraded.

In order to prevent degradation of reading precision of bar-code reading means 78, distance regulating projection 85c is formed on the upper surface of guide member 85. Projection 85c extends on the upper surface from a portion around bar-code reading means 78 toward inclined surfaces 85a and 85b. The upper surface of distance regulating projection 85c is flat, and the height from the upper surface of guide member 85 to that of distance regulating projection 85c is lower than that from the upper surface of guide member 85 to the top face of magnetic head 77, as shown in FIG. 25.

Distance H2 between the upper surface of distance regulating projection 85c and the lower surface of stationary conveying guide 72b is set to be a sum of the thickness of ticket TP and 0.1 to 0.3 mm.

When the thickness of ticket TP is increased more than a reference thickness due to a change in environment such as humidity, distance regulating projection 85c is particularly effective. More specifically, when head unit 76 is relatively moved to record and/or reproduce data on and/or from ticket TP which is held at the predetermined position in ticket holding unit 72 and is increased in thickness, not only magnetic head 77 but also distance regulating projection 85c are brought into sliding contact with the rear surface of ticket TP. Distance regulating projection 85c which is brought into sliding contact with the rear surface of ticket TP maintains distance H1 between bar-code reading means 78 and bar-code region BC on the rear surface of ticket TP constant. Thus, bar-code reading means 78 can read bar-code BC with the best reading precision.

Figure 1:
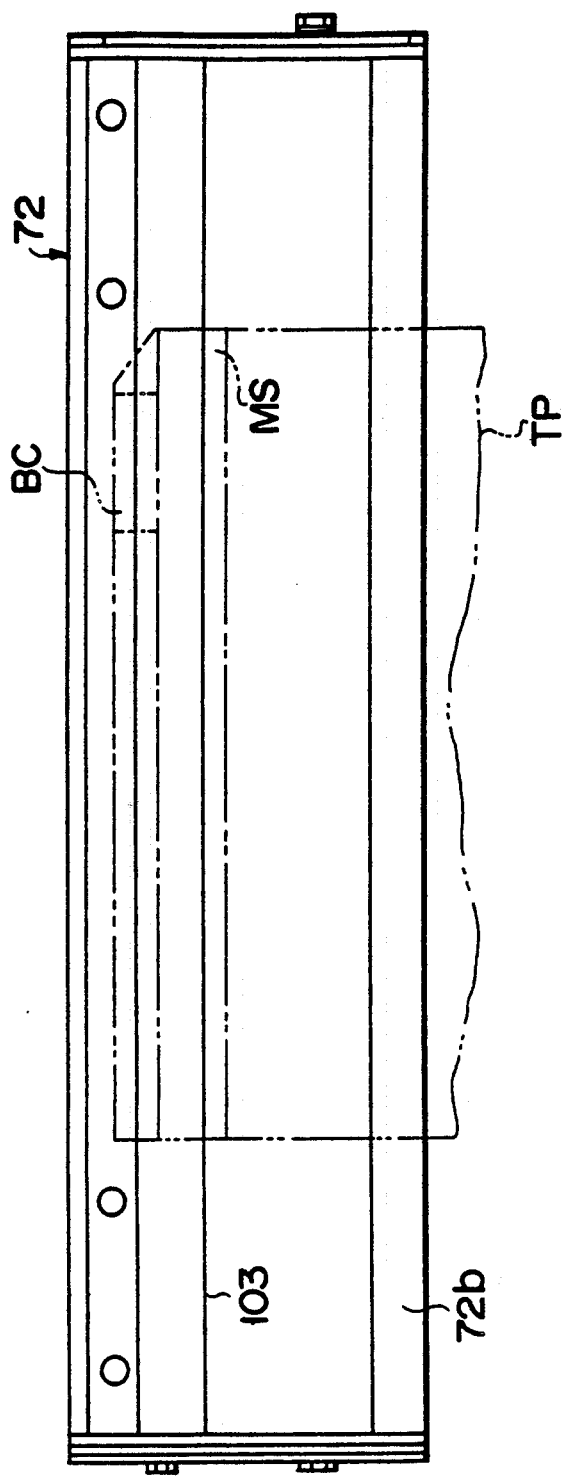
FIG. 1 is a plan view showing an embodiment of a friction member.

Friction member 103 is attached to the lower surface of first stationary conveying guide 72b on a region corresponding to magnetic stripe MS of ticket TP held at the predetermined position in ticket holding unit 72, as shown in FIGS. 1 and 25.

Magnetic head 77 on head unit 76, which is moved to the home position when the power switch of the ticket issuing apparatus is turned on and the apparatus is initialized (in this case, no ticket TP is held in ticket holding unit 72), projects toward first stationary conveying guide 72b upon operation of a biasing means (not shown) for obtaining a predetermined sliding contact pressure. As a result, head 77 is brought into light sliding contact with friction member 103.

During initialization, friction member 103 must have a small friction force with magnetic head 7 so as to protect the sliding surface of magnetic head 77 from being worn and to reduce the power of motor MT2 required for moving head unit 76.

When ticket TP is held at the predetermined position in ticket holding unit 72, friction member 103 must function not only to maintain a contact pressure of magnetic head 77 with respect to magnetic stripe MS on the rear surface of ticket TP constant, but also to prevent ticket TP from being skewed on first stationary conveying guide 72b due to a friction force generated between ticket TP and moving magnetic head 77.

Therefore, friction member 103 must be formed of a material which has a large friction coefficient with ticket TP, a small friction coefficient with magnetic head 77, a small compressed permanent strain, and good anti-wear properties.

As conventional materials for a friction member, urethane rubber, CR (chloroprene rubber) sponge, PE (polyethylene) foam, and the like are well known. However, these materials can generate a friction force large enough to prevent skew of ticket TP but have too large friction coefficients with magnetic head 77. Therefore, when head unit 76 is moved to the home position while the ticket issuing apparatus is initialized, a large torque is required to move head unit 76, and the sliding surface of magnetic head 77 is considerably worn. When a plastic material having a small friction coefficient with magnetic head 77 is employed as friction member 103 to eliminate the drawbacks associated with magnetic head 77, plastic friction member 103 cannot generate a friction force large enough to prevent skew of ticket TP.

The inventors found that high-density microcell urethane foam (trade name: PORON, available from Japanese company: Inoue MTP Co., Ltd.) was best suited as a material satisfying the above two conflicting requirements. The Table below shows characteristics of high-density microcell urethane foam and those of other materials for the purpose of comparison.

TABLE

| Item | Unit | High-density Microcell Urethane Foam | CR Sponge | PE Foam | Test Method |
|---|---|---|---|---|---|
| Density | g/cm$^3$ | 0.24-0.48 | 0.19 | 0.04 | |
| Tensile Strength | kg/cm$^2$ | 4.0-27.0 | 5.0 | 3.2 | Dumbbell No. 1 |
| Elongation | % | 105-300 | 150 | 180 | Dumbbell No. 1 |
| Tear Strength | kg/cm | 1.4-7.5 | 2.2 | 2.1 | Dumbbell Type B |
| Compression Residual Strain | % | 2.7-4.6 | 35 | 45 | Comply with JIS-K-6301 |
| Friction Coefficient | — | 0.3-0.7 | 1.2 | — | |
| Friction Coefficient | — | 0.2-1.1 | 0.9 | — | |

(values are typical values)

The high-density microcell urethane foam optimally satisfies the above conflicting requirements when a density=0.32 g/cm$^3$, a tensile strength=14.7 kg/cm$^2$, a elongation=155%, a tear strength=3.4 kg/cm, a compression residual strain=3.1%, a friction coefficient with respect to ticket TP=0.5, and a friction coefficient with respect to stainless steel according to the JIS (Japanese Industrial Standards) code "SUS" in Japan (forming the sliding surface of magnetic head 77)=0.6.

FIG. 27 shows an arrangement of a control system of the ticket checking/issuing apparatus.

Main controller 110 controls the entire control system. Main controller 110 is connected, through bus line 111, to IPL memory 112 formed by a ROM storing an Initial Program Loader, main memory 113 formed by a RAM, and character font memories 114 and 115 respectively formed by a ROM storing character fonts and a RAM.

Bus line 111 is also connected to keyboard 11 and ten-key pad 12 through keyboard controller 116, and to magnetic-card reader 24 through magnetic-card reader interface 117 (in FIG. 27, the interface is abbreviated as I/F).

Bus line 111 is connected to floppy disc drive unit 28, and to display means 21 through display controller 118. Display controller 118 is connected to memory 119 which is connected to bus line 111 and is formed by a RAM storing a text. Floppy disc FD loaded to floppy disc drive unit 28 stores data such as system programs, firmware, character and font data, and the like. These programs and data stored in floppy disc FD are loaded to main memory 113 and character font memory 115 by the IPL stored in IPL memory 112 when the power switch of main body 10 is turned on.

Journal printing means 62 is connected to bus line 111 through journal printing means interface 120. Telephone line or wire 22 and telephone 121 are connected to bus line 111 through NCU (network control unit)-/modem 122 and communication controller 123. Communication controller 123 automatically connects main controller 110 to a host apparatus (not shown) through telephone line 22 when the power switch of main body 10 is turned on. Telephone 121 is allowed to perform communication even when the power switch of main body 10 is turned off.

Bus line 111 is also connected to console panel 18, and to printing means 51, bar-code reading means 78, magnetic head 77, and conveying means 124 respectively through printing means interface 125, bar-code reading means interface 126, magnetic processor interface 127, and conveying means controller 128.

Conveying means 124 is connected to above-mentioned various sensors SR1 to SR7, SR10, and SR11, solenoids SL1 to SL3, and motors MT1, MT2, and MT3.

The operation of the control system with the above arrangement will be described hereinafter with reference to FIGS. 28 to 30.

First, issuing processing of unissued tickets TP stored in hopper 13 will be described below with reference to FIGS. 28 and 29. FIG. 28 shows the flow of tickets TP in main body 10 during issuing processing by solid arrows.

Upon operation of keyboard 11, the ticket checking/issuing apparatus is set in a ticket issuing mode. Thereafter, data is exchanged in a conventional manner between the apparatus and the host apparatus to obtain all the data necessary for issuing a desired ticket. The output shaft of motor MT1 is rotated to rotate pickup roller 33, conveying rollers 35 and 36, and insertion rollers 37 in one direction. As a result, one unissued ticket TP is picked up from hopper 13 into conveying path 34. When sensor SR1 detects this, first solenoid SL1 corresponding to pickup roller 33 is deenergized. As a result, stopper member 1a corresponding to first solenoid SL1 is engaged with pickup roller 33, and roller 33 is stopped regardless of rotation of motor MT1. When the leading end of picked-up ticket TP is detected by sensor SR1, third solenoid SL3 is energized to withdraw the pawls of the free end portion of stopper member 47 in ticket holding unit 72 from conveying path 34. Thus, ticket TP is guided into conveying path 34 in ticket holding unit 72.

When sensor SR1 detects the trailing end of ticket TP, second solenoid SL2 corresponding to first conveying roller 35 is deenergized. As a result, stopper member 2a corresponding to second solenoid SL2 is engaged with first conveying roller 35, thus stopping the rotation of roller 35. When sensor SR2 in ticket holding unit 72 detects the trailing end of ticket TP (indicated by reference symbol "a" in FIG. 29), the output shaft of motor MT1 is rotated in the other direction, and third solenoid SL3 is deenergized. Thus, the pawls of the free end portion of stopper member 47 corresponding to third solenoid SL3 are inserted again into conveying path 34 in ticket holding unit 72. Therefore, ticket TP is conveyed toward second conveying roller 36 by insertion rollers 37 rotated in the reverse direction in conveying path 34 in ticket holding unit 72, and abuts against the pawls of the free end portion of stopper member 47 in a closed state. Thereafter, motor MT1 is stopped.

Immediately after ticket TP abuts against the pawls of the free end portion of stopper member 47, insertion rollers 37 are kept rotated. However, since a pressing force of driven rollers 40 with respect to rollers 37 is weak, insertion rollers 37 slip on ticket TP, and do not apply a large load to ticket TP. Ticket TP is held at the predetermined position in ticket holding unit 72 upon abutting against the pawls of the free end portion of stopper member 47 and is clamped between rollers 37 and 40.

When motor MT1 is stopped and ticket TP is held at the predetermined position in ticket holding unit 72, as described above, a current is supplied to motor MT2. Motor MT2 causes head unit 76 to reciprocate along guide shafts 74 and 75 between the predetermined range in accordance with the output signals from home and end position sensors SR4 and SR5. Magnetic head 77 in reciprocating head unit 76 writes predetermined data such as destination, airline name, seat No. and the like in magnetic stripe MS of ticket TP. In order to check an error of data written in magnetic stripe MS, magnetic head 77 reads the written data. Note that in this case, bar-code reading means 78 in head unit 76 is rendered inoperative.

If an error is detected from the data once recorded on magnetic stripe MS of ticket TP by head 77, the output shaft of motor MT1 is rotated in one direction in order to discharge the corresponding ticket TP from ticket insertion port 26 upon operation of insertion rollers 37.

Figure 29:
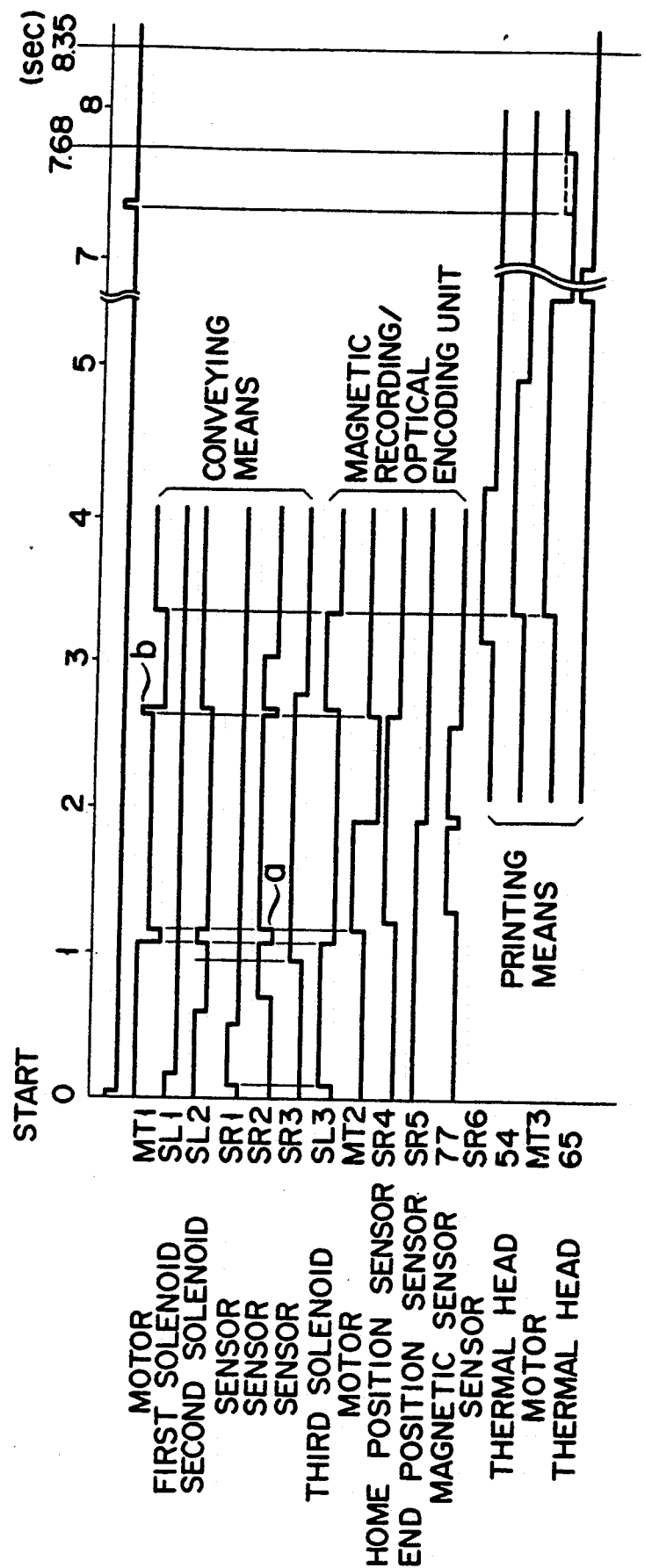
FIG. 29 is a view showing time charts of operations of various constituting components (sensor, motor, solenoid, and thermal head) while issuing processing is performed for unissued boarding tickets stored in a hopper of the main body of the ticket checking/issuing apparatus.

If no error is detected in the recorded data, when home position sensor SR4 detects that head unit 76 is returned to its home position, the output shaft of motor MT1 is slightly rotated in one direction to separate ticket TP from the pawls of the free end portion of stopper member 47 (indicated by reference symbol "b" in FIG. 29). Thereafter, third solenoid SL3 is energized, so that the pawls of the free end portion of stopper member 47 are withdrawn from conveying path 34 in ticket holding unit 72. Then, the output shaft of motor MT1 is rotated in the other direction. As a result, ticket TP is conveyed in a direction to be separated from ticket insertion port 26 in ticket holding unit 72 upon operation of insertion rollers 37 and second conveying roller 36, and is guided toward branch path 49 by selector gate 50. When a predetermined period of time has passed after the leading end of ticket TP was detected by sensor SR6 in branch path 49, third solenoid SL3 corresponding to ticket holding unit 72 is deenergized in order to insert the pawls of the free end portion of stopper member 47 into conveying path 34 in ticket holding unit 72. At the same time, the output shaft of motor MT3 is rotated in one direction so as to rotate platen roller 52 in one direction. Thermal head 54 prints, on the surface of ticket TP, the same data as that recorded on magnetic stripe MS in ticket holding unit 72, as shown in FIG. 32. After the printing operation is completed, ticket TP is discharged into stacker 16.

When the printing operation is completed, the output shaft of motor MT2 is rotated in the other direction so as to drive platen roller 64 of journal printing means 62. Thermal head 65 of journal printing means 62 prints, on journal paper JP, the same data as that printed on ticket TP.

Ticket checking/issuing processing when a ticket is inserted from ticket insertion port 26 formed in the front surface of display-means supporting frame 28 of main body 10 will be described below with reference to FIG. 33. FIG. 28 shows flows of tickets in main body 10 by ticket issuing processing by dotted arrows. Note that tickets inserted from ticket insertion port 26 include, e.g., a group airline ticket, a handwritten airline ticket, a credit specification recording a note of issuance of airline ticket, and a complimentary ticket, as described above. A bar-code representing the type of ticket is attached to each of these tickets, and a magnetic stripe is added to the group airline ticket.

When sensor SR3 detects the ticket inserted in ticket insertion port 26, the output shaft of motor MT1 is rotated in the other direction so as to fetch the inserted ticket into main body 10 by insertion and driven rollers 37 and 40. In this case, since third solenoid SL3 is kept deenergized, the pawls of the free end portion of stopper member 47 projects inside conveying path 34 in ticket holding unit 72. The ticket fetched into the interior of main body 10 from ticket insertion port 26 abuts against the pawls of the free end portion of stopper member 47 so as to be held at the predetermined position in ticket holding unit 72. When sensor SR2 detects the ticket held at the predetermined position, rotation of the output shaft of motor MT1 is stopped, and the output shaft of motor MT2 is then rotated in accordance with the outputs from home and end position sensors SR4 and SR5 so as to reciprocate head unit 76. Bar-code reading means 78 of head unit 76 reads the bar-code on the rear surface of the ticket, and discriminates the type of ticket. When the ticket is a group airline ticket having a magnetic stripe, head unit 76 is reciprocated twice. Bar-code reading means 78 reads the bar-code and magnetic head 77 reads data from the magnetic stripe during first reciprocal movement. Magnetic head 77 writes predetermined data and reads the written data for checking during second reciprocal movement.

Figure 30:
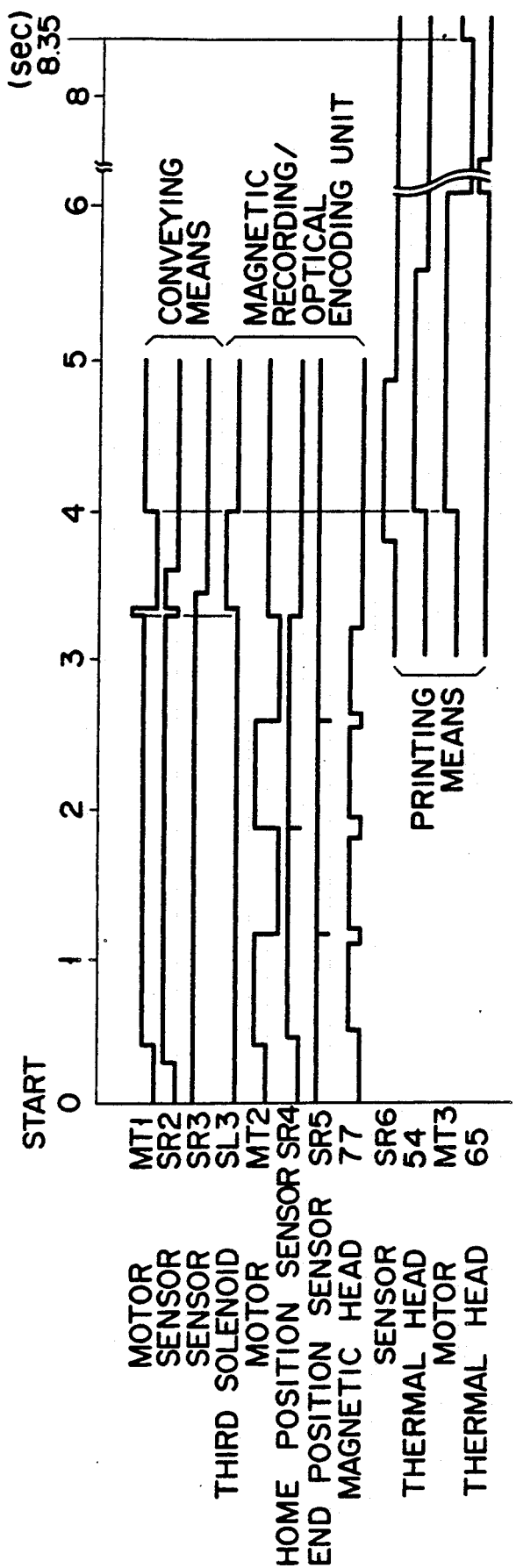
FIG. 30 is a view schematically showing time charts of the operations of the various constituting components while issuing processing is performed for a group-reserved boarding ticket inserted from the ticket insertion port on the front surface of the main body of the ticket checking/issuing apparatus.

The operation of magnetic head 77 shown in FIG. 30 indicates a case of the group airline ticket. When the reciprocal movement of head unit 76 is completed, the output shaft of motor MT1 is slightly rotated in one direction so that the leading edge of the ticket is separated from the pawls of the free end portion of stopper member 47 (indicated by reference symbol "c" in FIG. 30). Then, solenoid SL3 is energized to withdraw the pawls of the free end portion of stopper member 47 from conveying path 34 in ticket holding unit 72. The output shaft of motor MT1 is then rotated in the other direction. As a result, the ticket is fed into branch path 49 by insertion rollers 37.

Thereafter, predetermined data is printed on the group airline ticket by printing means 51, and is then discharged into stacker 16. At the same time, journal printing means 62 prints necessary data on journal paper JP.

The handwritten airline ticket and the complimentary ticket are fed to stacker 16 without being subjected to printing at printing means 51.

The credit specification is printed with predetermined data by printing means 51, and is then discharged into stacker 16. At the same time, journal printing means 62 prints necessary data on journal paper JP.

According to the above embodiment described above, grooves 98a and 99a, middle portions of which extend for about 180° in the circumferential direction and two end portions of which extend at opposite positions in the radial direction toward two ends in the longitudinal, are formed in large-diameter portions 98 and 99 at the two ends of shaft 97 for holding pivotal conveying guide 96. Engaging pin 100 of head unit 76 which reciprocates along the longitudinal direction of shaft 97 is slid along grooves 98a and 99a, so that shaft 97 is pivoted together with pivotal conveying guide 96 upon movement of head unit 76. In this manner, since pivotal conveying guide 96 is pivoted upon movement of head unit 76, a time required for the operation of head unit 76 with respect to a ticket held at the predetermined position in ticket holding unit 72 can be shortened as compared to a conventional arrangement wherein drive means for the pivotal conveying guide is independently operated, so that the drive means first pivots the pivotal conveying guide and then drives the head unit. Since no independent drive means for pivotal conveying guide 96 is necessary, the drive mechanism therefor can be simplified and rendered compact.

In the above embodiment, when predetermined processing with respect to a ticket held at the predetermined position in ticket holding unit 72 is completed, the output shaft of motor MT1 is slightly rotated in one direction, and as a result, the ticket is separated from the pawls of the free end portion of stopper member 47 by insertion rollers 37. Then, third solenoid SL3 is energized so that the pawls of the free end portion of stopper member 47 is withdrawn from conveying path 34 in ticket holding unit 72, and the ticket is then conveyed toward printing means 51 and stacker 16. Therefore, when the pawls of the free end of stopper 47 is withdrawn, the end of the ticket can be reliably prevented from being rolled up or bent. Such a rolled-up or bent end of the ticket causes ticket jam during conveyance.

What is claimed is:

1. Data recording unit, for apparatus which issues tickets on which data is recorded, comprising:
   means for holding the ticket;
   means for recording data on the ticket;
   means for conveying the ticket into and out of said holding means through said recording unit;
   means for moving said recording means along said holding means and bringing said recording means into sliding contact with the ticket when the ticket is held by said holding means; and
   a friction member which is arranged on a surface of said holding means opposing said recording means so as to frictionally hold the ticket against said holding means, said friction member having a friction coefficient between itself and the ticket larger than that between said recording means and the ticket;
   wherein said moving means brings said recording means into sliding contact with said friction member when said recording means is moved while said holding means does not hold a ticket, and said moving means brings said recording means into contact with the ticket when said holding means holds the ticket by means of said friction member.

2. An apparatus according to claim 1, wherein:
   said apparatus comprises ticket storing means for storing tickets;
   said ticket conveying means has a ticket conveying path which extends from said ticket storing means through said recording means and has an extending end serving as a ticket issuing port;
   said holding means is arranged in a portion of said ticket conveying path corresponding to said recording means; and
   said holding means temporarily holds the ticket conveyed from said ticket storing means toward said recording means, and releases the temporal holding of the ticket after said recording means records data on the ticket so as to allow conveyance of the ticket traveling from aid holding means toward said ticket issuing port by said ticket conveying means.

3. An apparatus according to claim 1, wherein said friction member has an elongated shape extending in a moving direction of said recording means.

4. An apparatus according to claim 1, wherein said friction member is mainly formed by high-density microcell urethane foam.

5. A data reproducing unit, which is used in a ticket checking apparatus for checking a ticket on which data is recorded, comprising:
   means for holding the ticket;
   means for reproducing data from the ticket;
   means for conveying the ticket into and out of said holding means through said reproducing unit;
   means for moving said reproducing means along said holding means and bringing said reproducing means into sliding contact with the ticket when the ticket is held by said holding means; and
   a friction member which is arranged on a surface of said holding means opposing said reproducing means so as to frictionally hold the ticket against said holding means, said friction member having a friction coefficient between itself and the ticket larger than that between said reproducing means and the ticket;
   wherein said moving means brings said reproducing means into sliding contact with said friction member when said reproducing means is moved while said holding means does not hold a ticket, and said moving means brings said reproducing means into contact with the ticket when said holding means holds the ticket by means of said friction member.

6. An apparatus according to claim 5, wherein:
   said apparatus comprises ticket storing means for storing tickets;
   said ticket conveying means has a ticket conveying path which extends from said ticket storing means through said reproducing means and has an extending end serving as a ticket issuing port;
   said holding means is arranged in a portion of said ticket conveying path corresponding to said reproducing means; and
   said holding means temporarily holds the ticket conveyed from said ticket storing means toward said reproducing means, and releases the temporal holding of the ticket after said reproducing means reproduces data from the ticket so as to allow conveyance of the ticket traveling from said holding means toward said ticket issuing port by said ticket conveying means.

7. An apparats according to claim 5, wherein said friction member has an elongated shape extending in a moving direction of said reproducing means.

8. An apparatus according to claim 5, wherein said friction member is mainly formed by high-density microcell urethane foam.

* * * * *